(12) United States Patent
Seol et al.

(10) Patent No.: US 10,019,705 B2
(45) Date of Patent: Jul. 10, 2018

(54) DISPLAY DEVICE AND CONTROLLING METHOD THEREOF

(71) Applicant: LG ELECTRONICS INC., Seoul (KR)

(72) Inventors: Jie Seol, Seoul (KR); Hyunok Lee, Seoul (KR); Yongjoo Oh, Seoul (KR); Hanl Park, Seoul (KR); Joonsung Sohn, Seoul (KR); Hoyoung Kim, Seoul (KR); Juno Yoon, Seoul (KR); Minho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 14/857,639

(22) Filed: Sep. 17, 2015

(65) Prior Publication Data

US 2017/0004484 A1 Jan. 5, 2017

(30) Foreign Application Priority Data

Jul. 1, 2015 (KR) ........................ 10-2015-0094362

(51) Int. Cl.
*G09G 5/00* (2006.01)
*G06Q 20/32* (2012.01)
(Continued)

(52) U.S. Cl.
CPC ......... *G06Q 20/327* (2013.01); *G06F 3/0416* (2013.01); *G06F 3/0482* (2013.01);
(Continued)

(58) Field of Classification Search
CPC ........... G06F 2203/041; G06F 3/03547; G06F 3/041; G06F 3/0416; G06F 2203/04111; G06F 3/044; G06F 3/017; G06F 3/04883
(Continued)

(56) References Cited

U.S. PATENT DOCUMENTS

| 2012/0197743 | A1* | 8/2012 | Grigg | G06Q 20/20 705/16 |
| 2013/0060618 | A1* | 3/2013 | Barton | G06Q 20/3674 705/14.23 |
| 2013/0254051 | A1 | 9/2013 | Kim et al. | |
| 2015/0135108 | A1 | 5/2015 | Pope et al. | |

(Continued)

FOREIGN PATENT DOCUMENTS

| KR | 10-2013-0106899 A | 10/2013 |
| KR | 10-1330962 B1 | 11/2013 |

(Continued)

*Primary Examiner* — Jennifer Nguyen
(74) *Attorney, Agent, or Firm* — Birch, Stewart, Kolasch & Birch, LLP

(57) ABSTRACT

A display device including a wireless communication unit configured to provide wireless communication; a touch screen; a user input unit configured to receive an input of identification information for a user authentication; and a controller configured to launch a first mode for performing a general payment function in response to the input identification information matching stored identification information, display on the touch screen a display object containing payment card information in the first mode, and switch from the first mode to a second mode for performing a separate processing mode in response to a preset first touch gesture on the touch screen.

18 Claims, 23 Drawing Sheets

(51) Int. Cl.
  *G06Q 20/34* (2012.01)
  *G06Q 20/40* (2012.01)
  *G06F 3/041* (2006.01)
  *G06F 3/0482* (2013.01)
  *G06F 3/0484* (2013.01)
  *G06F 3/0488* (2013.01)
  *G06Q 20/22* (2012.01)

(52) U.S. Cl.
  CPC ...... *G06F 3/04842* (2013.01); *G06F 3/04883* (2013.01); *G06Q 20/227* (2013.01); *G06Q 20/322* (2013.01); *G06Q 20/356* (2013.01); *G06Q 20/409* (2013.01); *G06Q 20/40145* (2013.01)

(58) Field of Classification Search
  USPC .............. 345/173, 174; 705/41, 44; 715/863
  See application file for complete search history.

(56) References Cited

U.S. PATENT DOCUMENTS

| | | | |
|---|---|---|---|
| 2015/0161592 A1* | 6/2015 | Park | G06Q 20/341 705/41 |
| 2015/0339652 A1 | 11/2015 | Park et al. | |
| 2015/0348001 A1* | 12/2015 | Van Os | G06Q 20/40 705/44 |
| 2016/0062483 A1* | 3/2016 | Baldwin | G06F 3/0346 345/156 |
| 2016/0182713 A1* | 6/2016 | Salihi | H04M 3/42153 455/414.1 |
| 2016/0253669 A1* | 9/2016 | Yoon | G06Q 20/4014 |

FOREIGN PATENT DOCUMENTS

| | | |
|---|---|---|
| KR | 10-2015-0021943 A | 3/2015 |
| KR | 10-2015-0044669 A | 4/2015 |
| KR | 10-2015-0053855 A | 5/2015 |

* cited by examiner (a)  (b)

(a)                          (b)

(a)                            (b)

(a)        (b)

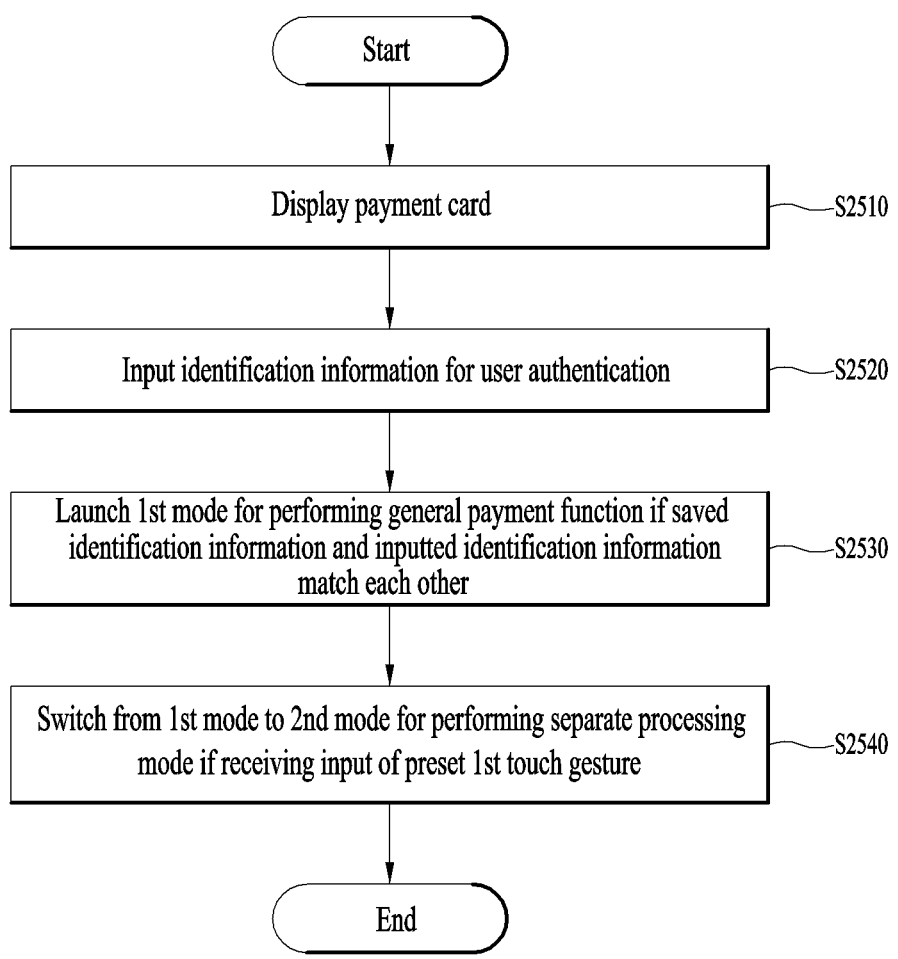

DISPLAY DEVICE AND CONTROLLING METHOD THEREOF

Pursuant to 35 U.S.C. § 119(a), this application claims the benefit of earlier filing date and right of priority to Korean Application No. 10-2015-0094362, filed on Jul. 1, 2015, the contents of which are hereby incorporated by reference herein in their entirety.

BACKGROUND OF THE INVENTION

Field of the Invention

The present invention relates to a display device, and more particularly, to a display device and controlling method thereof.

Discussion of the Related Art

Generally, terminals can be classified into mobile/portable terminals and stationary terminals. In particular, the mobile terminals can be further classified into handheld terminals and vehicle mounted terminals. Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal can receive multicast signals for providing visual contents such as a broadcast, a video, a television program and the like.

As functions of the terminal are becoming diversified, the terminal tends to be implemented as a multimedia player provided with complex functions such as photographing of photos or videos, playback of music or video files, game play, broadcast reception and the like for example.

Meanwhile, a terminal can perform a payment function. Although the payment made through the terminal is convenient, it is normally possible to make a payment of a single type. Hence, the demand for a technology capable of enabling payments of various modes and managing receipt data efficiently is increasingly rising.

SUMMARY OF THE INVENTION

Accordingly, embodiments of the present invention are directed to a display device and controlling method thereof that substantially obviate one or more problems due to limitations and disadvantages of the related art.

An object of the present invention is to provide a display device and controlling method thereof, by which an additional payment mode can be entered in response to a user's intention as well a general payment mode.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a display device according to one embodiment of the present invention may include a user input unit configured to receive an input of identification information for a user authentication, a controller launching a first mode for performing a general payment function if saved identification information and the input identification information match each other, and an output unit configured to display an object containing payment card information, wherein if receiving an input of a preset first touch gesture, the controller switches from the first mode to a second mode for performing a separate processing mode.

In another aspect of the present invention, as embodied and broadly described herein, a method of controlling a display device according to another embodiment of the present invention may include the steps of displaying an object containing payment card information, receiving an input of identification information for a user authentication, if saved identification information and the input identification information match each other, launching a first mode for performing a general payment function, and if receiving an input of a preset first touch gesture, switching from the first mode to a second mode for performing a separate processing mode.

Effects obtainable from the present invention may be non-limited by the above mentioned effect. And, other unmentioned effects can be clearly understood from the following description by those having ordinary skill in the technical field to which the present invention pertains. Both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 25 is a flowchart for a method of controlling a display device according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
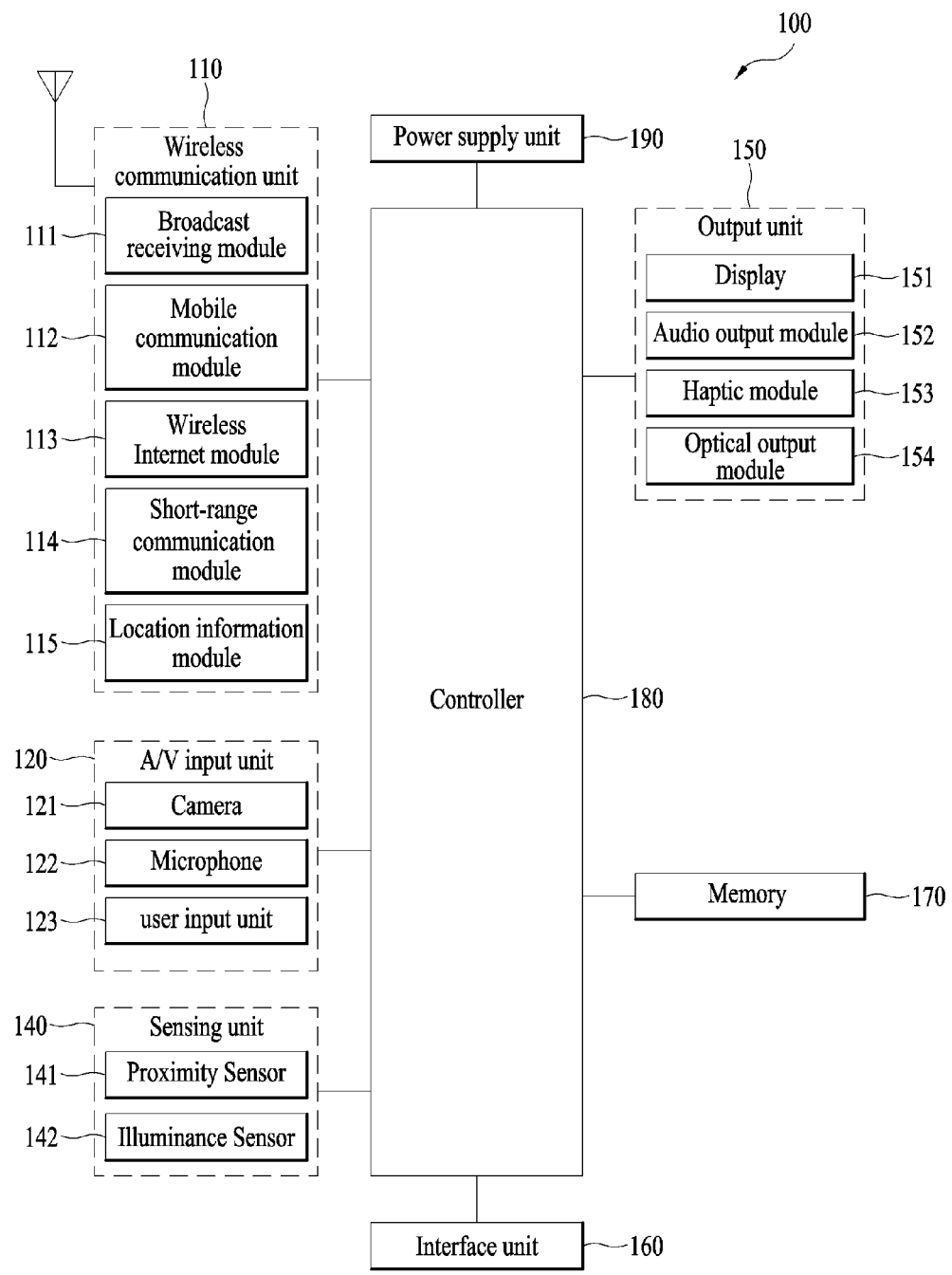
FIG. 1A is a diagram illustrating a mobile terminal device related to an embodiment of the present invention.
Figure 1B:
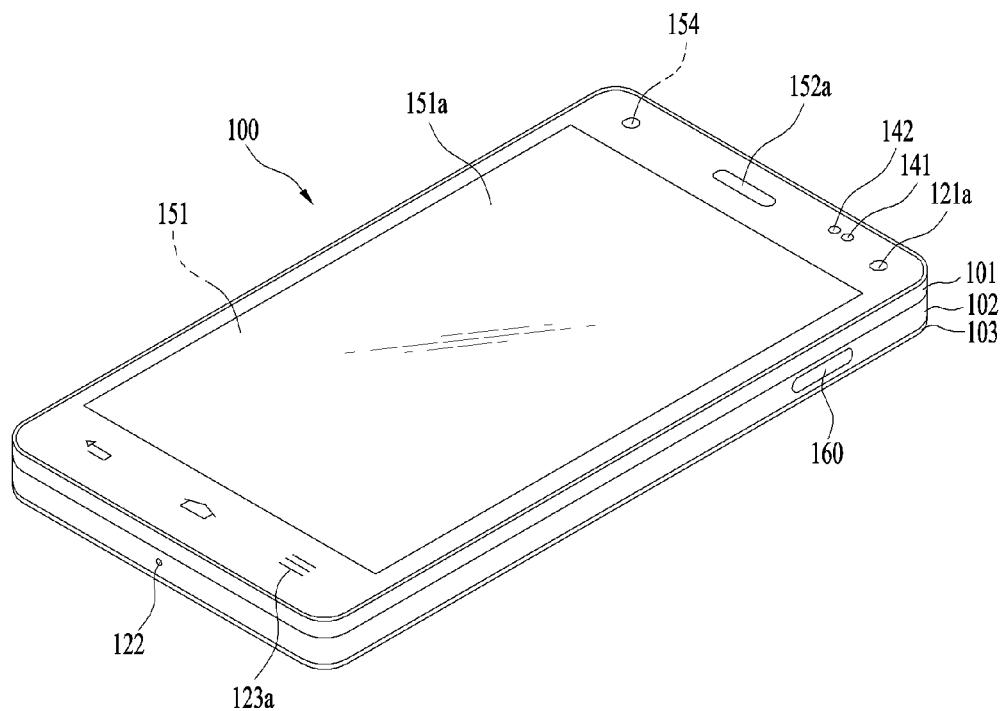
FIG. 1B and FIG. 1C are diagrams illustrating the concept of one example of a mobile terminal device related to an embodiment of the present invention in different views, respectively.
Figure 1C:
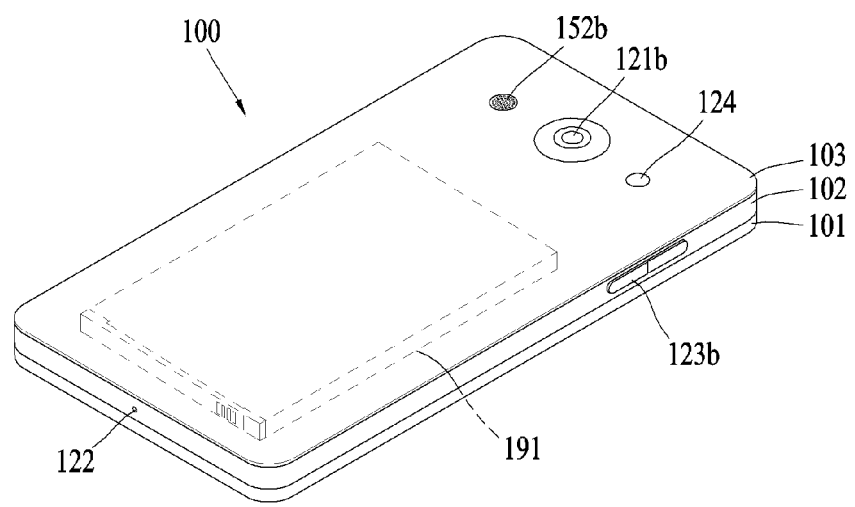

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, information and the like input or output through the above-mentioned components or running application programs saved in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical, object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body.

Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
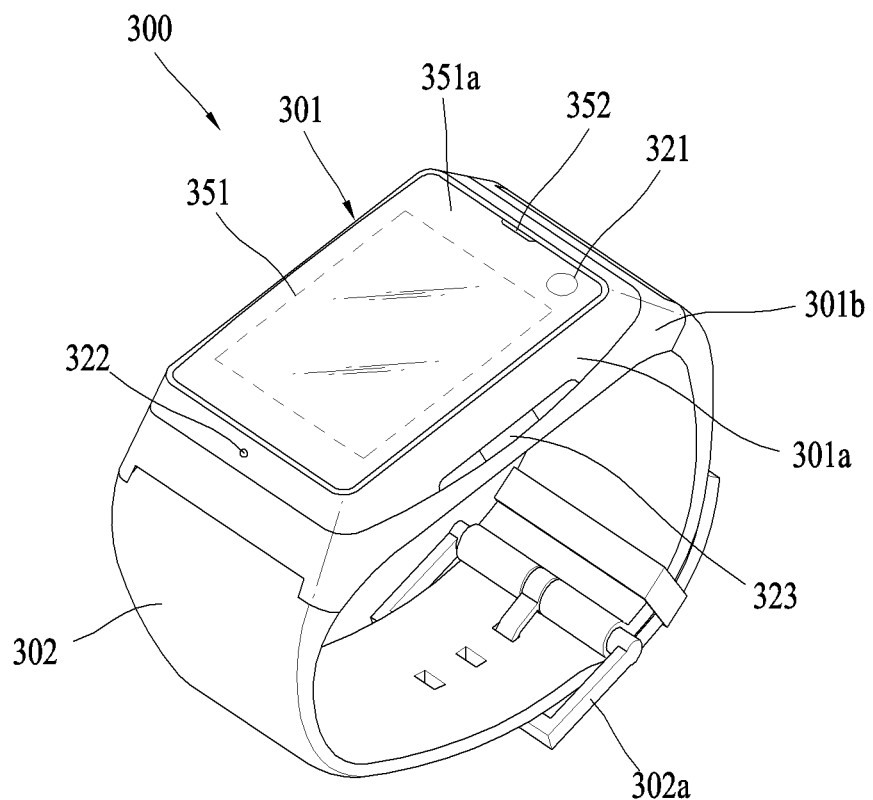
FIG. 2 is a perspective diagram of a mobile terminal device of a watch type related to another embodiment of the present invention.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle. Further preferred embodiments will be described in more detail with reference to additional drawing figures. It is understood by those skilled in the art that the present features can be embodied in several forms without departing from the characteristics thereof.

Figure 3:
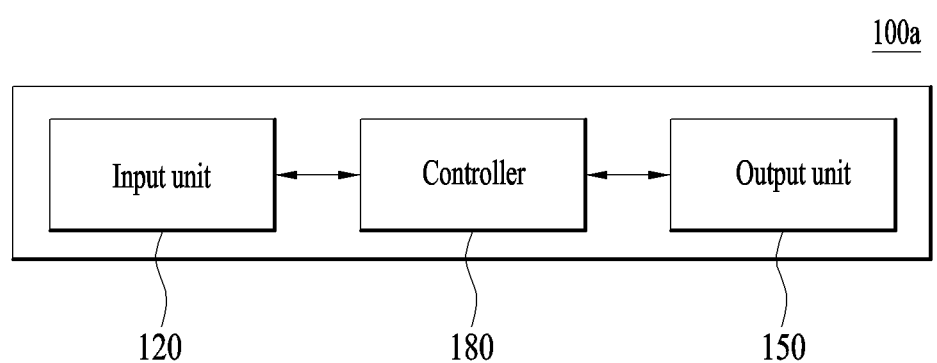
FIG. 3 is a block diagram of a display device according to an embodiment of the present invention.

FIG. 3 is a block diagram of a display device according to an embodiment of the present invention. Referring to FIG. 3, a display device 100a includes an input unit 120, an output unit 150 and a controller 180.

The input unit 120 can receive an input of identification information for user authentication. The input unit 120 may be disposed on one lateral surface of the display device 100a. For instance, the input unit 120 can include a keypad for inputting characters or numerals or a camera for receiving an input of a figure of a person. The input unit 120 may also include a fingerprint recognition sensor for recognizing a fingerprint or an iris recognition sensor for recognizing an iris.

If the identification information is a password, the display device 100a can receive an input of the password through the input unit 120. If the identification information is a figure of a user, the display device 100a can receive an input of the figure of the user through the input unit 120. If the identification information is fingerprint information, the display device 100a can receive an input of the fingerprint information through the input unit 120. If the identification information is iris information, the display device 100a can receive an input of the iris information through the input unit 120.

The input unit 120 may be built in one body with the output unit 150. Moreover, the output unit 150 may include a display unit. The input unit 120 may include a touch sensor for recognizing a touch gesture or a fingerprint recognition sensor for recognizing fingerprint information. And, the input unit 120 may be built in one body with the display unit. Hence, the display device 100a can receive an input of touch gesture or fingerprint information input onto the display unit. The display device 100a displays the keypad on the display unit and can then perform a user authentication process by determining whether the characters corresponding to an input touch gesture matches a password. Alternatively, the display device 100a can perform a user authentication process by determining whether user's fingerprint information input on to the display unit matches saved fingerprint information.

The output unit 150 can display an object including payment card information. The display device 100a can perform a payment procedure using the object including the payment card information. In this instance, the object including the payment card information may be a payment card type. In the present specification, the object including the payment card information shall be named a payment card. In particular, the payment card may include a card set by a user or a last used card. Alternatively, the payment card may include a card most frequently used for a predetermined period. When the display device 100a includes a plurality of cards, the display device 100a may further display a user interface capable of displaying one payment card and changing it to another card. For instance, the display device 100a can display a button for a scroll up & down or right & left and/or a user interface for indicating a presence of other cards. For instance, the user interface may mean a button, a bar, an icon, a folder and/or the like.

If the saved identification information and the input identification information match each other, the controller 180 can launch a first mode for performing a general payment function. The controller 180 can launch the first mode if the saved identification information and the input identification information match each other. In this instance, the first mode may mean a payment mode for performing the general payment function. For instance, if the display device 100a is tagged to a payment terminal (e.g., POS) or a barcode of a displayed payment card is read, the payment terminal can perform a payment process by performing a communication with a server. If a corresponding payment is made, a receipt data including details of use can be received by the display device 100a. And, the first mode may mean the general payment mode for performing the above-described process.

When receiving an input of a preset touch gesture, the controller 180 can switch the first mode to a second mode for performing a separate processing mode. When the display device 100a launches a payment function of the first mode, if the display device 100a receives an input of the preset touch gesture, the display device 100a can switch to the second mode. According to one embodiment, the preset touch gesture includes a touch gesture of holding a touch over a preset time after fingerprint authentication, a long touch gesture of holding a touch for a predetermined time, or a sweep touch gesture of applying a touch to one point and then moving to another point by holding the touch. The above-mentioned touch gestures are provided exemplarily and various touch gestures can be set as the preset touch gesture. The second mode may mean the separate processing mode for processing payment breakdown information separately. The separate processing mode may mean a mode for performing a receipt non-issuance function. Moreover, the separate processing mode may include a secret payment function of maintaining a security of a payment breakdown. Depending on a user's selection, the display device 100a may not receive or save an issued receipt. The display device 100a can save payment breakdown summary information or a simplified receipt. The display device 100a may perform a secret payment function. In this instance, the secret payment function may mean a function of encrypting a receipt data including details of use and then saving the encrypted receipt data. Details of a corresponding embodiment shall be described later.

The display device 100a can distinguish the payment mode in a plurality of modes. And, the display device 100a can perform the mode switching in response to a user's simple touch gesture. A detailed embodiment for the display device 100a to switch a mode is described in detail as follows.

Figure 4:
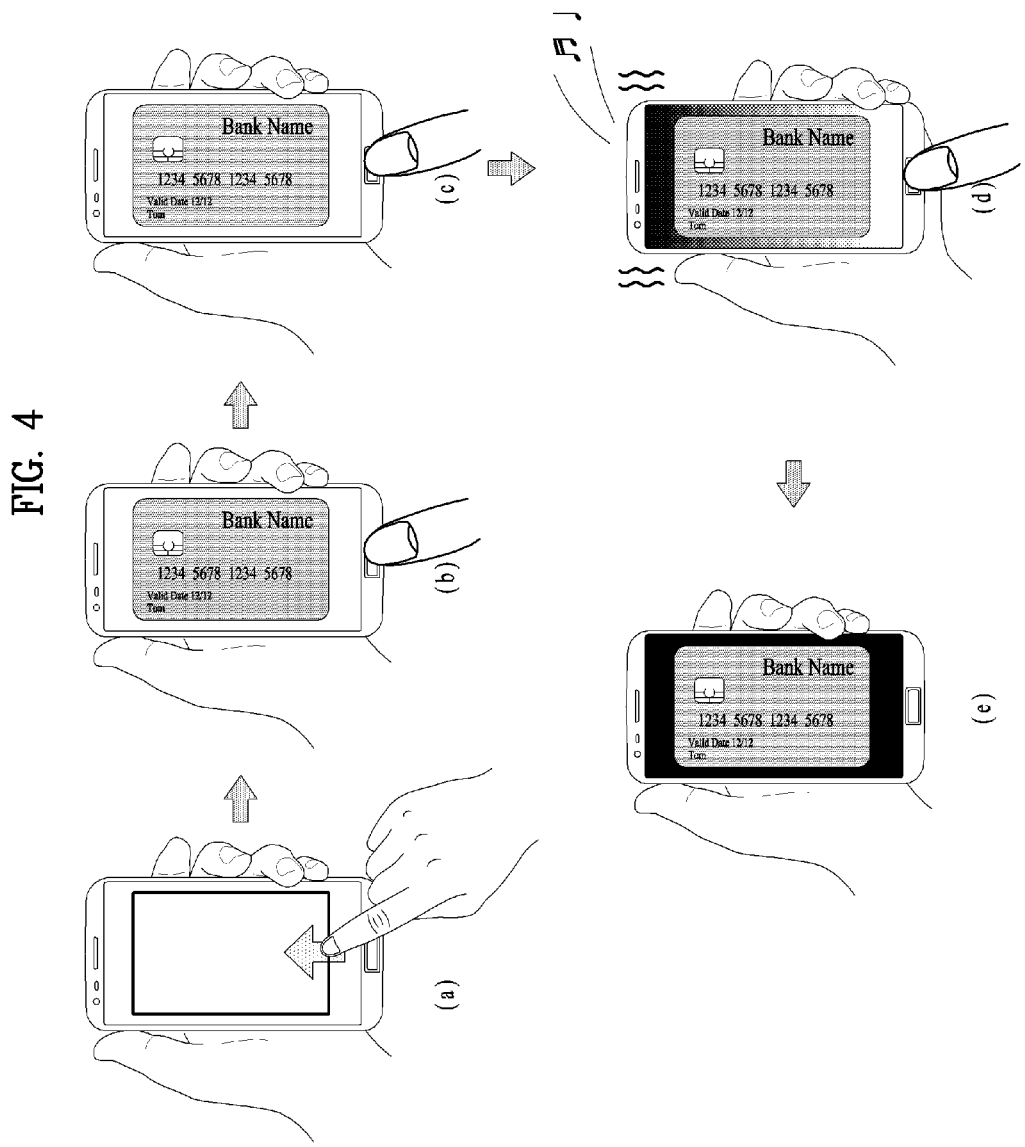
FIG. 4 is a diagram illustrating a process for switching to a second mode from a first mode according to a first embodiment of the present invention.

Next, FIG. 4 is a diagram illustrating a process for switching to a second mode from a first mode according to a first embodiment of the present invention. Referring to FIG. 4(a), a display device currently launching a payment mode is illustrated. According to one embodiment, the display device can recognize a touch gesture, which is applied by moving from a bottom end portion of a display unit to a top direction, as a payment mode launch command. If the display device receives an input of a touch gesture, the display device can display a figure image. In this instance, the figure image can include a blank card shape. The display of the figure image indicates the display device has launched a payment mode. Although the display device has launched the payment mode, since user authentication is not completed, the display device does not display detailed card information and the like. Hence, the display device can display the figure image only. And, the display device may output a message for requesting user authentication.

Referring to FIG. 4(b), the display device currently performing a user authentication process is illustrated. As mentioned in the foregoing description, the user authentication can be performed by inputting a password. In FIG. 4(b), the display device performs the user authentication process by receiving an input of a user's fingerprint. The display device can include an input unit separate from the display unit. The display device can also include a fingerprint recognition sensor capable of recognizing a fingerprint. A user can input a fingerprint to the input unit. The display device receives the input of the user's fingerprint and can then compare the input fingerprint to a pre-saved fingerprint. If the pre-saved fingerprint and the input fingerprint match each other, the user authentication is completed. Moreover, the input unit may include a touch sensor capable of recognizing a touch gesture and can then recognize a touch input.

According to the description with reference to FIG. 4(b), in the display device, the display unit and the input unit are separate from each other. Yet, the input unit and the display unit can be formed in one body in the display device. In particular, the input unit includes a fingerprint recognition sensor and can be built in one body with the display unit. The display device may receive an input of a user's fingerprint on the display unit. The display device can receive an input of a fingerprint through a whole region on the display unit or a predetermined region on the display unit. When the display device receives an input of a fingerprint through the predetermined region on the display unit, a guide of a fingerprint recognition region may be displayed.

Referring to FIG. 4(c), the display device currently receiving an input of a touch gesture for a switching to a second mode is illustrated. After launching the first mode, the user can hold the touch state. The input unit includes a fingerprint recognition sensor and a touch sensor and can then recognize a user's fingerprint and a touch gesture, respectively. The display device can launch the first mode by performing a user authentication process through a user's fingerprint input. If the fingerprint authentication is complete, the display device can output a data that indicates the authentication completion. For instance, the display device can display an authentication complete message and/or output a voice/sound indicating the authentication completion or a vibration pattern or tactile feedback indicating the authentication completion. If the user's touch is continuously held after the first mode launch, the display device can launch the second mode.

Referring to FIG. 4(d), the display device currently switching to the second mode is illustrated. If the display device recognizes a user's touch gesture, the display device can switch to the second mode from the first mode. The display device can inform the user of the switching to the second mode. According to one embodiment, the display device can change a color of a background screen to a different color. Once the display device initiates a second mode switching process, the display device can control the color of the background screen to be gradually changed from a bottom part toward a top part. If the display device changes the color of the background screen overall, the display device can end the second mode switching process.

Alternatively, if the display device initiates the second mode switching process, the display device can output a vibration or a notification sound. The vibration or the notification sound may be maintained until the second mode switching is finished. In particular, when the display device switches from the first mode to the second mode, the display device can output a notification indicating the mode switching. And, the notification indicating the mode switching may include at least one of a notification display of changing a color of a background screen, a notification sound of outputting a preset sound, and a notification vibration of outputting a preset vibration. The display device can output one of a color change of a background screen, a notification sound and a vibration or may output at least two notifications.

In particular, if an input of a touch with a user's fingerprint is received, the display device performs a fingerprint authentication process. If the fingerprint authentication is completed, the display device can output a visual, auditory or tactile feedback indicating the authentication completion. After a feedback output, if the user's touch is held over a predetermined time, the display device can switch to the second mode.

Referring to FIG. 4(e), the display device having finished the switching to the second mode is illustrated. When the display device switches to the second mode from the first mode, the display device output a notification. Ending of the notification can mean that the display device has switched the mode. According to the example shown in FIG. 4(e), if a color of a background screen is fully changed, the display device can complete the mode switching.

If input fingerprint information matches saved fingerprint information, the display device can launch the first mode. If the display device receives an input of a long touch gesture in the first mode, the display device can recognize the input as a command for switching to the second mode. Hence, if the display device receives the input of the long touch gesture over a predetermined time, the display device can switch to the second mode. Meanwhile, the display device can distinguish the first mode and the second mode from each other in other ways.

Figure 5:
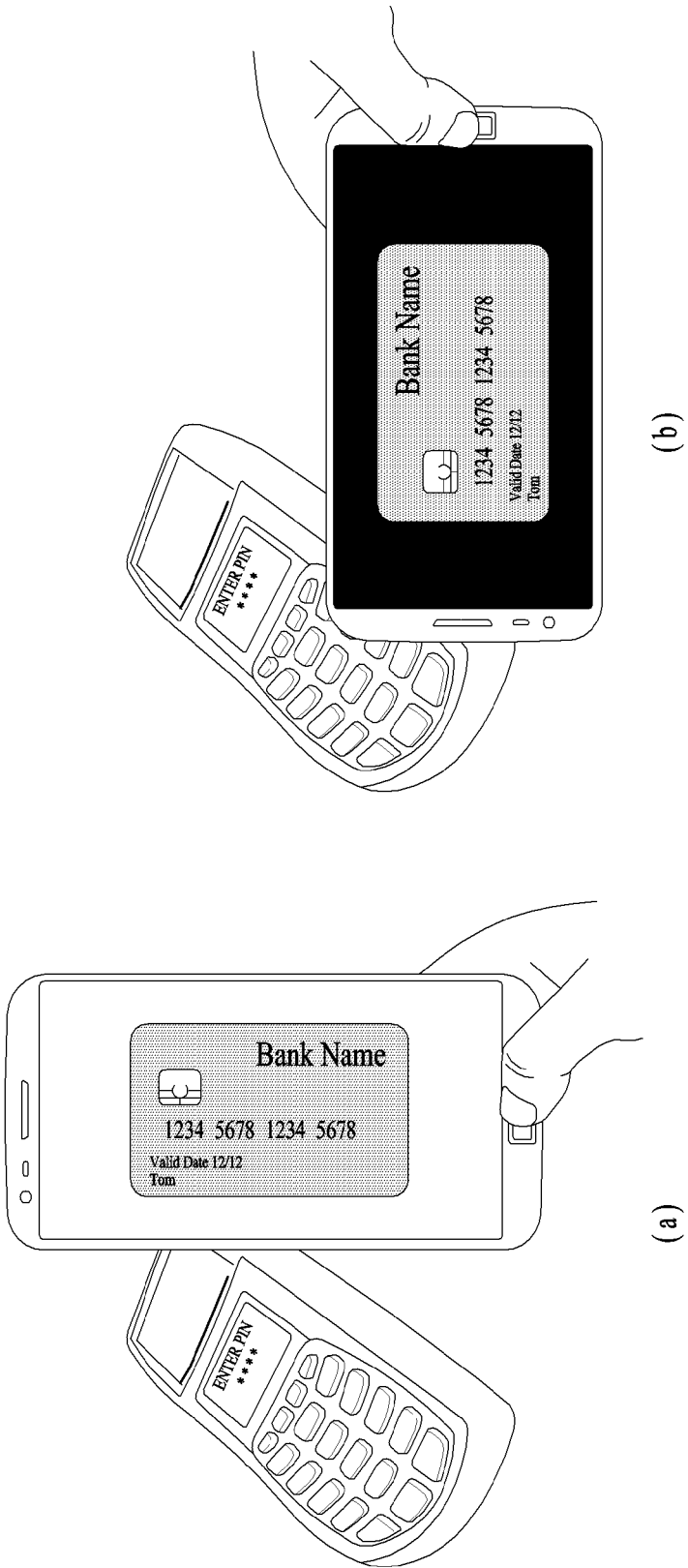
FIG. 5 is a diagram illustrating a process for switching to a second mode from a first mode according to a second embodiment of the present invention.

Next, FIG. 5 is a diagram illustrating a process for switching to a second mode from a first mode according to a second embodiment of the present invention. Referring to FIG. 5(a), a display device located in a vertical direction is illustrated. In response to an input of a touch gesture, the display device can switch to a second mode from a first mode. Yet, the display device can distinguish the first mode and the second mode from each other in accordance with a direction of a long axis. The display device can launch a payment mode. The display device can perform a user authentication process. When the payment mode is launched, the display device can detect a direction. If the display device is located in a manner that a vertical direction is a long direction, the display device can launch the payment mode as the first mode. If the display device is located in a normal direction in which top and bottom are normally located, the display device can launch the payment mode as the first mode. The display device displays a payment card and can represent a background screen in a color corresponding to the first mode. And, the display device can output a notification sound or a vibration pattern corresponding to the first mode.

Meanwhile, the display device can switch to the first mode from the second mode. While the display device is launching the payment mode as the second mode, the display device can be rotated at 90 degrees. As the display device is rotated at 90 degrees, if the display device is located in a manner that the vertical direction is the long direction or located in the normal direction, the display device can switch to the first mode from the second mode. If the mode is switched, the display device can change a color of a background screen. And, the display device can output a notification sound or a vibration pattern corresponding to the first mode.

Referring to FIG. 5(b), the display device located long in a horizontal direction is illustrated. As mentioned in the foregoing description, the display device can launch a payment mode and perform a user authentication process. When the display device launches the payment mode, the display device can detect a direction. If the display device is located in a manner that the horizontal direction is a long direction, the display device can launch the payment mode as the second mode. Alternatively, if the display device is located in a transverse direction in a manner that top and bottom are rotated at 90 degrees, the display device can launch the payment mode as the second mode. The display device displays a payment card and can represent a background screen in a color corresponding to the second mode. And, the display device can output a notification sound or a vibration pattern corresponding to the second mode.

Meanwhile, the display device can switch to the second mode from the first mode. While the display device is launching the payment mode as the first mode, the display device can be rotated at 90 degrees. As the display device is rotated at 90 degrees, if the display device is located in a manner that the vertical direction is the long direction or located in the transverse direction, the display device can switch to the second mode from the first mode. If the mode is switched, the display device can change a color of a background screen. And, the display device can output a notification sound or a vibration pattern corresponding to the second mode.

Figure 6:
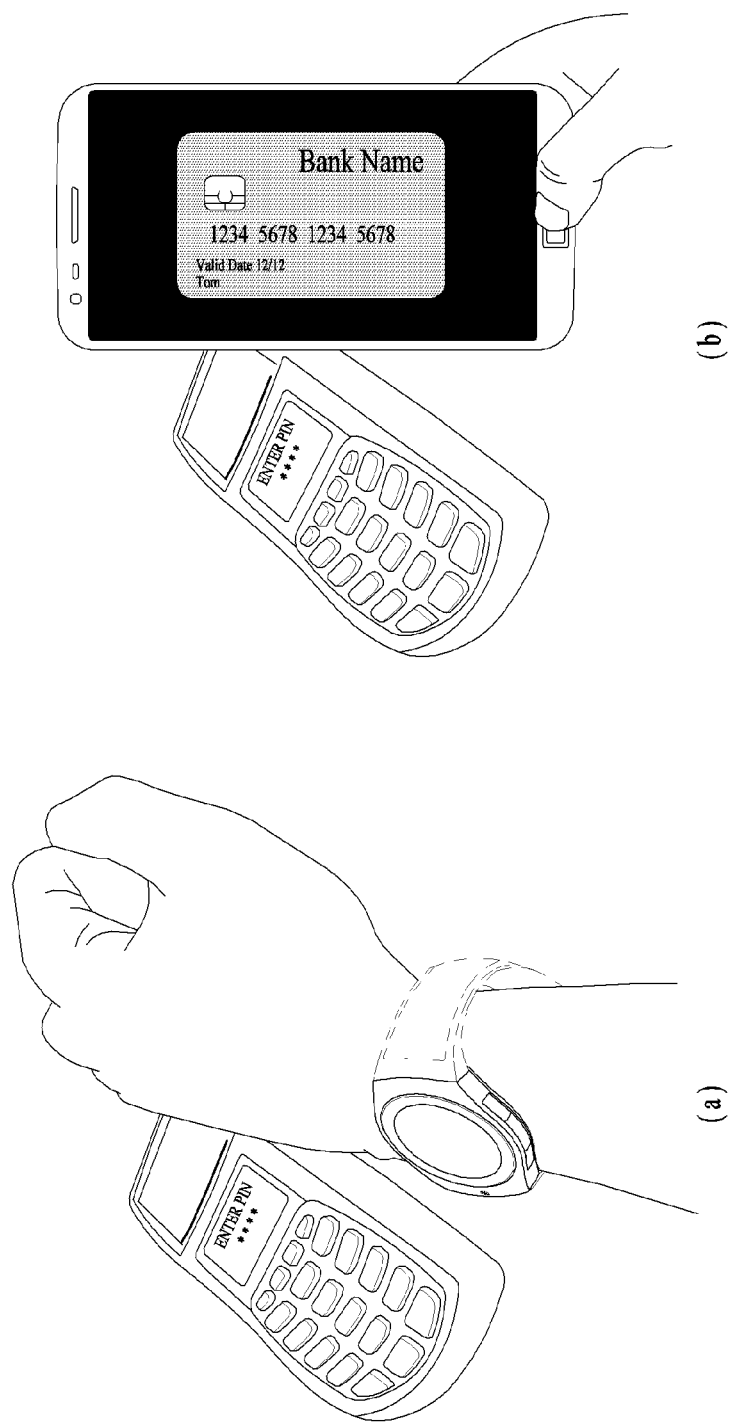
FIG. 6 is a diagram illustrating a process for switching to a second mode from a first mode according to a third embodiment of the present invention.

FIG. 6 is a diagram illustrating a process for switching to a second mode from a first mode according to a third embodiment of the present invention. Referring to FIG. 6(a), a wearable device is illustrated. A display device can interwork with the wearable device. For instance, a message received by the display device can be forwarded to the wearable device. And, a phone call received by the wearable device may be forwarded to the display device. Moreover, data saved in the wearable device may be sent to or shared with the display device. The wearable device and the display device can synchronize data by periods or can be synchronized with each other in case of an event occurrence.

first and second modes of a payment mode may be distinguished from each other in accordance with a terminal device for making a payment. For instance, a user can make a payment using the wearable device interworking with the display device. The wearable device can perform a payment process of the first mode. Hence, when a user performs a payment process through the wearable device, the wearable device can perform a general payment process. The wearable device can display a background screen of a display unit in a color corresponding to the first mode. And, the wearable device may output a notification sound or a vibration pattern corresponding to the first mode.

Referring to FIG. 6(b), the display device is illustrated. The display device can perform a payment process of the second mode. Hence, when a user performs a payment process through the display device, the display device can perform a separate processing process. The display device can display a background screen of a display unit in a color corresponding to the second mode. And, the display device can output a notification sound or a vibration pattern corresponding to the second mode.

As mentioned in the foregoing description, the display device can interwork with the wearable device. Hence, each of the display device and the wearable device can contain the same card information. For instance, if the user inputs information of Card A to the display device, the display device can synchronize the information of the Card A with the wearable device. In particular, the wearable device can store the information of the Card A as well. Further, if the user inputs information of Card B to the wearable device, the wearable device can synchronize the information of the Card B with the display device. Hence, each of the display device and the wearable device can store the same card information.

Figure 7:
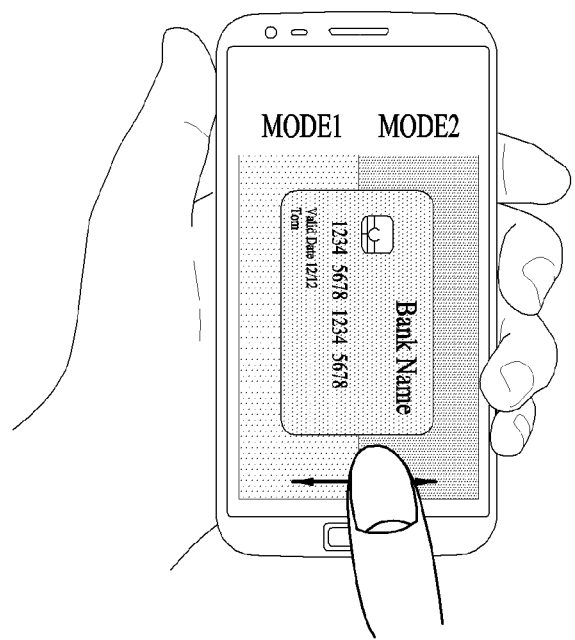
FIG. 7 is a diagram illustrating a process for switching to a second mode from a first mode according to a fourth embodiment of the present invention.

FIG. 7 is a diagram illustrating a process for switching to a second mode from a first mode according to a fourth embodiment of the present invention. Referring to FIG. 7, a display device currently displaying a payment card is illustrated. If the display device receives an input of a preset touch gesture, the display device can switch, to a second mode from a first mode. For instance, the preset touch gesture recognized as a mode switch command may include a sweep gesture. If the display device receives an input of a sweep gesture, the display device can switch to the second mode from the first mode, and vice versa.

For instance, the display device can launch a payment function in the first mode. The display device can receive an input of a sweep gesture applied by inputting a touch to a prescribed region of an outside of the displayed card and then moving to the left by holding the touch. In response to the sweep gesture, the display device can switch to the second mode from the first mode. The first mode and the second mode may contain background screens different from each other in color, respectively. If a color of a full background screen of the display device is changed to a color of the second mode, the display device can complete the switching to the second mode.

Similarly, the display device can switch to the first mode from the second mode. The display device can receive an input of a sweep gesture applied to a prescribed region of the outside of the displayed card by moving to the right. In response to the input sweep gesture, the display device can switch to the first mode from the second mode. If a color of a full background screen of the display device is changed to a color of the first mode, the display device can complete the switching to the first mode.

The display device can display a text indicating the first mode or the second mode. The display device can output a notification sound or vibration when the first mode and the second mode are switched to each other. In particular, a notification sound or vibration output by the display device in case of switching to the first mode may be different from that in case of switching to the second mode. Moreover, the display device can output the same notification sound or vibration indicating the mode switching irrespective of modes.

Figure 8:
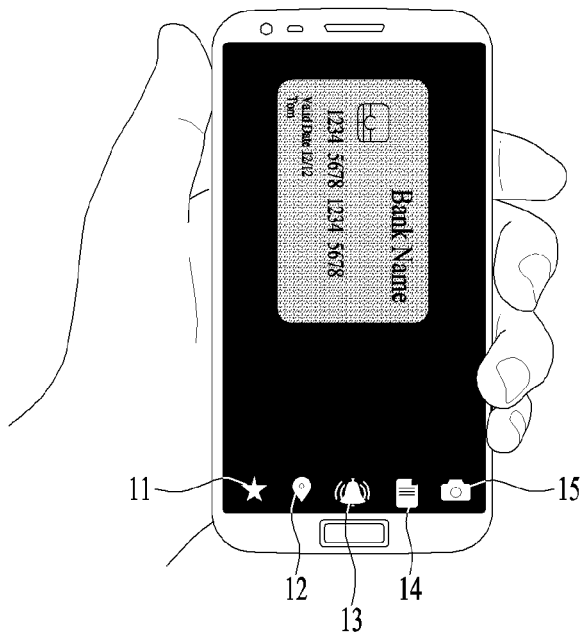
FIG. 8 is a diagram illustrating information tagged to receipt data according to one embodiment of the present invention.

Next, FIG. 8 is a diagram illustrating information tagged to receipt data according to one embodiment of the present invention. Referring to FIG. 8, the display device currently displaying tagging information is illustrated. The display device can switch to a second mode from a first mode. The second mode corresponds to a separate processing mode. Generally, the second mode can include a mode for performing a receipt non-issuance function. Yet, depending on a user's selection, the second mode can include a secret payment function for setting a security on a receipt or a function of saving a payment breakdown summary information. Meanwhile, when a receipt is saved in a second mode, the display device can add additional information to a receipt data in the second mode. If the display device launches the second mode, the display device can display additional information menu on a prescribed region of the display unit.

For instance, the additional information may include check information 11, location information 12, notification information 13, memo information 14, image information 15 and/or the like. The check information 11 may include a mark that means an important receipt, and the location information 12 may include a mark that means a location of use. The notification information 13 may include a mark that means a user's memo, and the memo information 14 may include a mark that means a use breakdown sharing with a counterpart. The image information 15 may include a mark that means a photo. The additional information menu shown in FIG. 8 is just exemplary and other menus can be further included.

A user can select at least one information menu from the displayed additional information menus. The user may select a plurality of menus. The display device can inform the user whether a prescribed menu is selected by changing a color of the menu selected by the user or changing a location of the selected menu slightly. After the additional information menu has been selected, if a payment is made, the display device can display the selected additional information menu on the receipt data containing the use breakdown. An embodiment for adding information to a receipt data shall be described in detail later.

Figure 9:
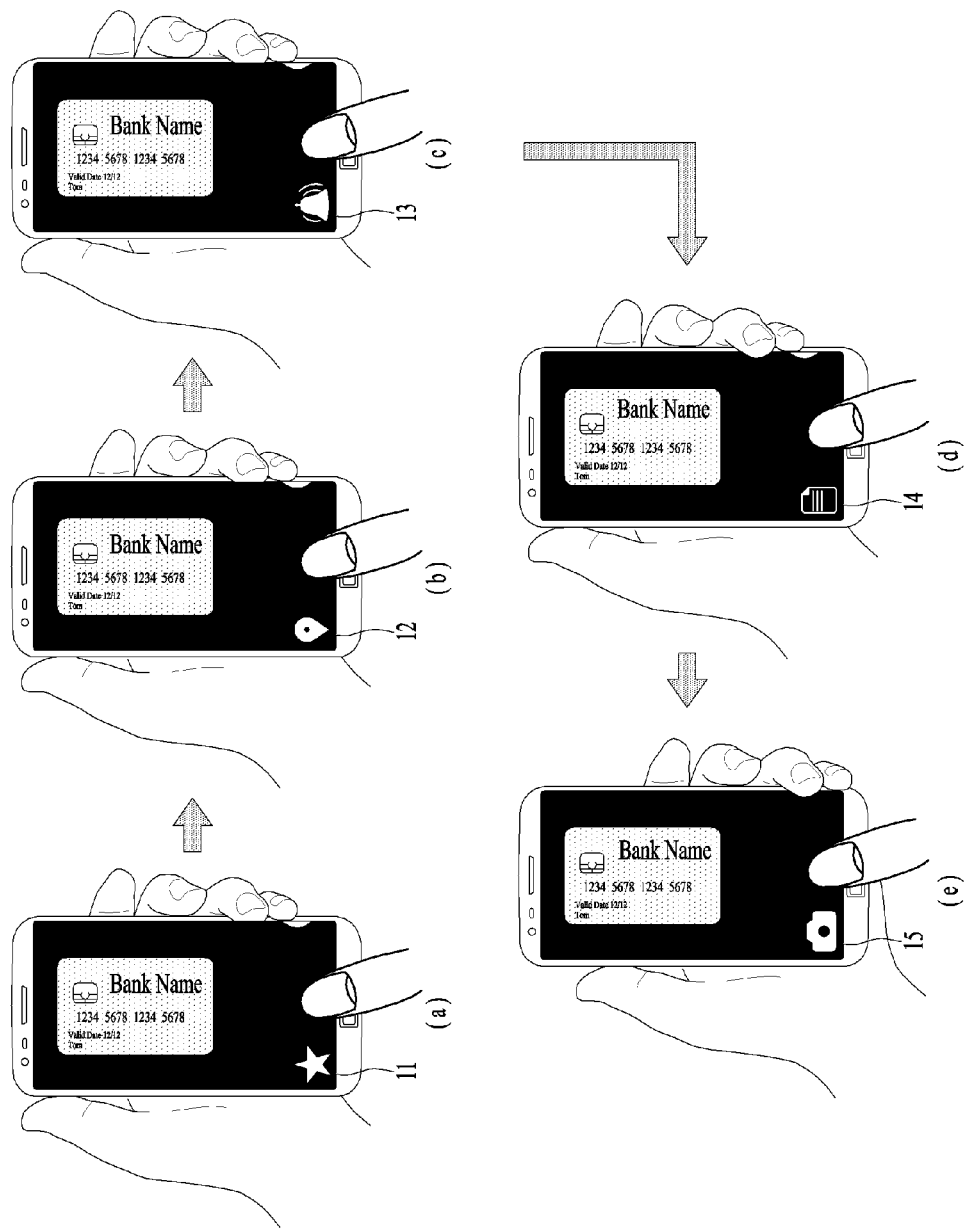
FIG. 9 is a diagram illustrating information tagged to receipt data according to another embodiment of the present invention.

FIG. 9 is a diagram illustrating information tagged to receipt data according to another embodiment of the present invention. Referring to FIG. 9(a), the display device currently displaying a menu of the check information 11 among the additional information is illustrated. As mentioned in the foregoing description, the entire menus of the additional information can be displayed on the display unit. A user can select at least one menu from the entire menus of the additional information. Yet, the display device can display a single menu among the additional information only.

When switching to the second mode, the display device can display additional information to add to a receipt data. The display device can display a single menu among a plurality of additional information. In FIG. 9(a), the display device displays the menu of the check information 11. If the display device receives an input of a long touch gesture over a predetermined time to a random region of the display unit, the display device can select the menu of the check information 11. If the display device receives an input of a short touch gesture under the predetermined time to a random region of the display unit, the display device can switch to a next menu of the additional information. If the display device receives an input of a touch gesture onto the displayed menu of the check information 11, the display device can select the menu of the check information 11. If the display device receives an input of a touch gesture to a region other than the displayed menu of the check information 11, the display device can switch to a next menu of the additional information.

Referring to FIG. 9(b), the display device currently displaying the menu of the location information 12 among the additional information is illustrated. If the display device receives an input of a long touch gesture over a predetermined time to a random region of the display unit, the display device can select the menu of the location information 12. If the display device receives an input of a short touch gesture under the predetermined time to a random region of the display unit, the display device can switch to a next menu of the additional information. If the display device receives an input of a touch gesture onto the displayed menu of the location information 12, the display device can select the menu of the location information 12. If the display device receives an input of a touch gesture to a region other than the displayed menu of the location information 12, the display device can switch to a next menu of the additional information.

Referring to FIG. 9(c), the display device currently displaying the menu of the notification information 13 among the additional information is illustrated. If the display device receives an input of a long touch gesture over a predetermined time to a random region of the display unit, the display device can select the menu of the notification information 13. If the display device receives an input of a short touch gesture under the predetermined time to a random region of the display unit, the display device can switch to a next menu of the additional information. If the display device receives an input of a touch gesture onto the displayed menu of the notification information 13, the display device can select the menu of the notification information 13. If the display device receives an input of a touch gesture to a region other than the displayed menu of the notification information 13, the display device can switch to a next menu of the additional information.

Referring to FIG. 9(d), the display device currently displaying the menu of the menu information 14 among the additional information is illustrated. If the display device receives an input of a long touch gesture over a predetermined time to a random region of the display unit, the display device can select the menu of the menu information 14. If the display device receives an input of a short touch gesture under the predetermined time to a random region of the display unit, the display device can switch to a next menu of the additional information. If the display device receives an input of a touch gesture onto the displayed menu of the memo information 14, the display device can select the menu of the memo information 14. If the display device receives an input of a touch gesture to a region other than the displayed menu of the memo information 14, the display device can switch to a next menu of the additional information.

Referring to FIG. 9(*e*), the display device currently displaying the menu of the image information 15 among the additional information is illustrated. If the display device receives an input of a long touch gesture over a predetermined time to a random region of the display unit, the display device can select the menu of the image information 15. If the display device receives an input of a short touch gesture under the predetermined time to a random region of the display unit, the display device can switch to a next menu of the additional information. If the display device receives an input of a touch gesture onto the displayed menu of the image information 15, the display device can select the menu of the image information 15. If the display device receives an input of a touch gesture to a region other than the displayed menu of the memo information 15, the display device can switch to a next menu of the additional information.

A plurality of the additional information may be selected. For instance, if a user selects both of the check information and the location information, the receipt data may contain check information attribute and location information attribute both.

Figure 10:
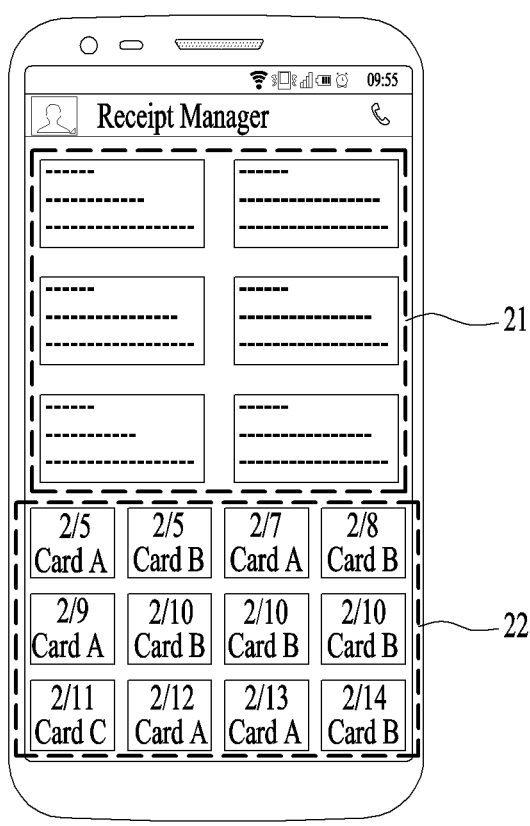
FIG. 10 is a diagram illustrating a receipt manager according to one embodiment of the present invention.

FIG. 10 is a diagram illustrating a receipt manager according to one embodiment of the present invention. Referring to FIG. 10, a screen of a receipt manager is illustrated. The receipt manager may include an application for managing received receipt data. The receipt manager can manage the received receipt data by sorting the received receipt data by such a reference as a date of use, a payment due date, a card and/or the like. In particular, when the receipt manager displays the receipt data by sorting the receipt data per date, the receipt manager can display at least one receipt data received by being used on the same date on the same screen. When the receipt manager sorts the receipt data by cards, the receipt manager can display the receipt data of the same card on the same screen.

The receipt manager can display a detailed breakdown region 21 and a summarized breakdown region 22 separately. The detailed breakdown region 21 can include a region for displaying received receipt data. In particular, the detailed breakdown region 21 can include the receipt data containing a card, an approval date, a time, an amount, a place and the like. In addition, the summarized breakdown region 22 can display date and card information only. In some cases, the summarized breakdown region 22 can display an amount of use. Information displayed on the summarized breakdown region 22 can be selected variously. The receipt manager can display the detailed breakdown region 21 and the summarized breakdown region 22 on the same screen. Summary information displayed on the summarized breakdown region 22 can correspond to the receipt data contained in the detailed breakdown region 21 of the same screen.

Figure 11:
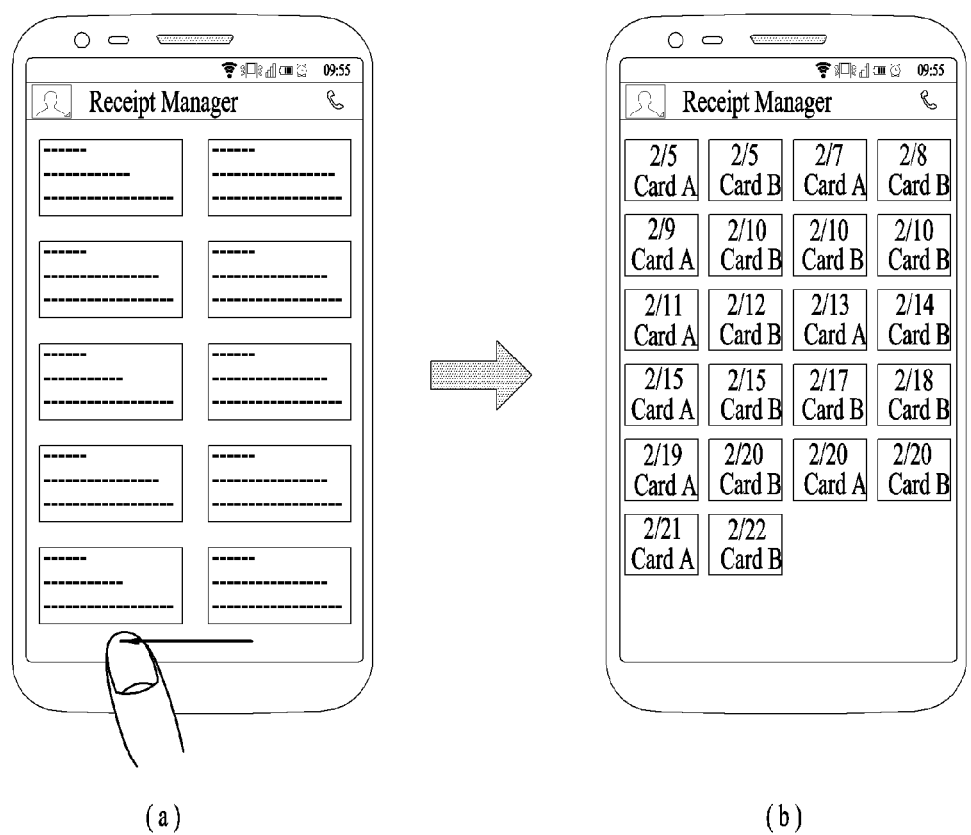
FIG. 11 is a diagram illustrating a receipt manager according to another embodiment of the present invention.

Next, FIG. 11 is a diagram illustrating a receipt manager according to another embodiment of the present invention. Referring to FIG. 11(*a*), a plurality of receipt data are illustrated. A receipt manager can display the receipt data, which contains detailed breakdown information, on a screen only. As mentioned in the foregoing description, the receipt manager can display the receipt data containing the detailed breakdown information by sorting the receipt data by such a reference as an approval date, a payment due date, a card, or the like. The receipt manager can display the sorted receipt data on separate screens, respectively. For instance, when the receipt manager displays the receipt data by sorting them by cards, the receipt data of Card A can be displayed on a first screen. If a touch gesture for turning a screen is input, the receipt manager can display a second screen for displaying the receipt data of Card B. The receipt manager can contain a plurality of screens on which the receipt data containing the detailed breakdown information are sorted. And, the receipt manager can switch the screens in response to an input of a touch gesture for turning a page.

Referring to FIG. 11(*b*), the receipt manager currently displaying summary information is illustrated. As mentioned in the foregoing description, the receipt manager can contain a plurality of screens for displaying receipt data containing detailed breakdown information. In response to a touch gesture for turning a screen, the receipt manager can sequentially turn a detailed breakdown screen. The receipt manager may have summary information screen contained in a last screen. The summary information screen may contain date and card information only. In some cases, the summary information screen may display an amount of use. The receipt manager sequentially switches the detailed breakdown screens and can then display a last detained breakdown screen. If a touch gesture for turning a screen is input again to the last detailed breakdown screen, the receipt manager can display the summary information screen.

Figure 12:
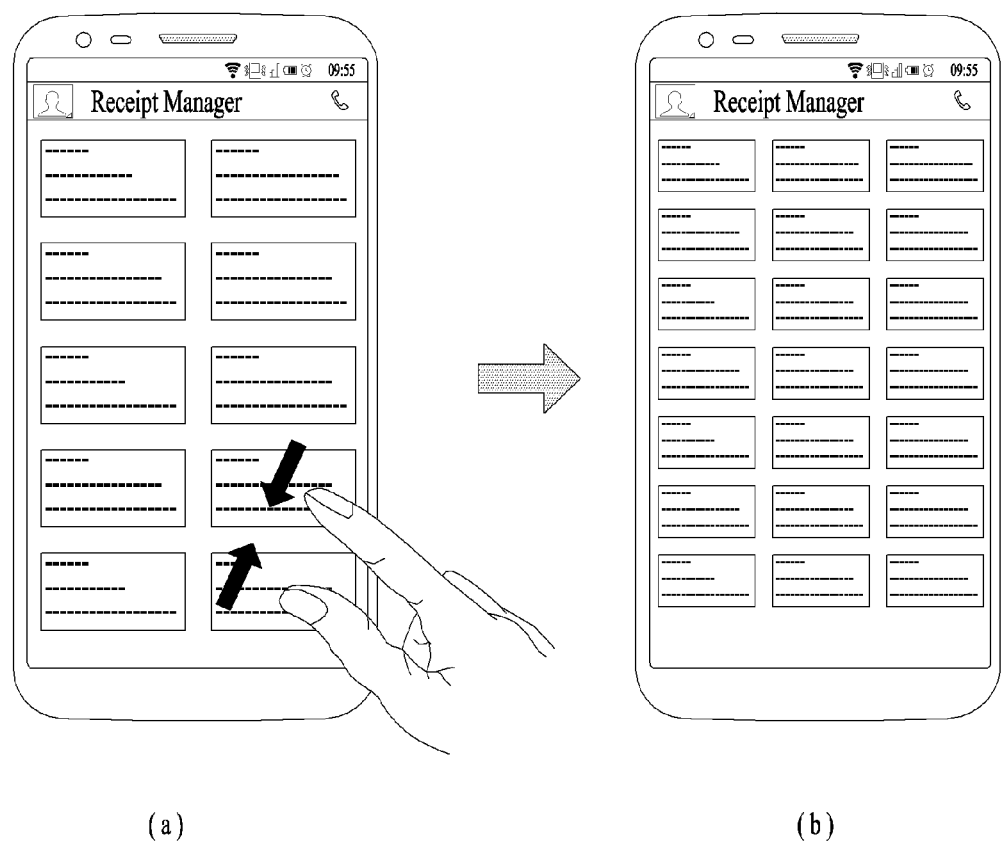
FIG. 12 is a diagram illustrating a process for adjusting a screen of a receipt manager according to one embodiment of the present invention.

FIG. 12 is a diagram illustrating a process for adjusting a screen of a receipt manager according to one embodiment of the present invention. Referring to FIG. 12(*a*), a receipt manager currently displaying receipt data containing detailed breakdown information is illustrated. The receipt manager can display receipt data containing a detailed breakdown and summary information list. The receipt data containing the detailed breakdown and the summary information list may be displayed on a single screen or may be displayed on separate screens, respectively. The receipt manager can display two receipt data on a single row. In particular, the receipt manager can display the receipt data on 2 steps.

The display device can receive an input of a touch gesture for reducing a screen to a screen having receipt data displayed thereon. Referring to FIG. 12(*b*), a receipt manager having a receipt data size adjusted is illustrated. If the display device receives a touch gesture for reducing a screen, the display device can reduce a size of a displayed receipt data. The display device can display the receipt data by 3 steps by reducing the receipt data. In response to a touch gesture for reducing a screen, the display device can display the receipt data by 4 or 5 steps.

The display device can receive an input of a touch gesture for enlarging a screen. In response to the screen enlarging touch gesture, the display device can display the receipt data by 1 or 2 steps again. In response to the screen enlarging or reducing touch gesture, the display device can adjust a size of information of the displayed receipt data. The receipt manager may receive an input of a screen enlarging or reducing touch gesture to summary information list screen. In response to the screen enlarging or reducing touch gesture, the receipt manager can adjust a size of the summary information list. So far, the receipt manager is described. In the following description, a method of managing receipts in second mode shall be described.

Figure 13:
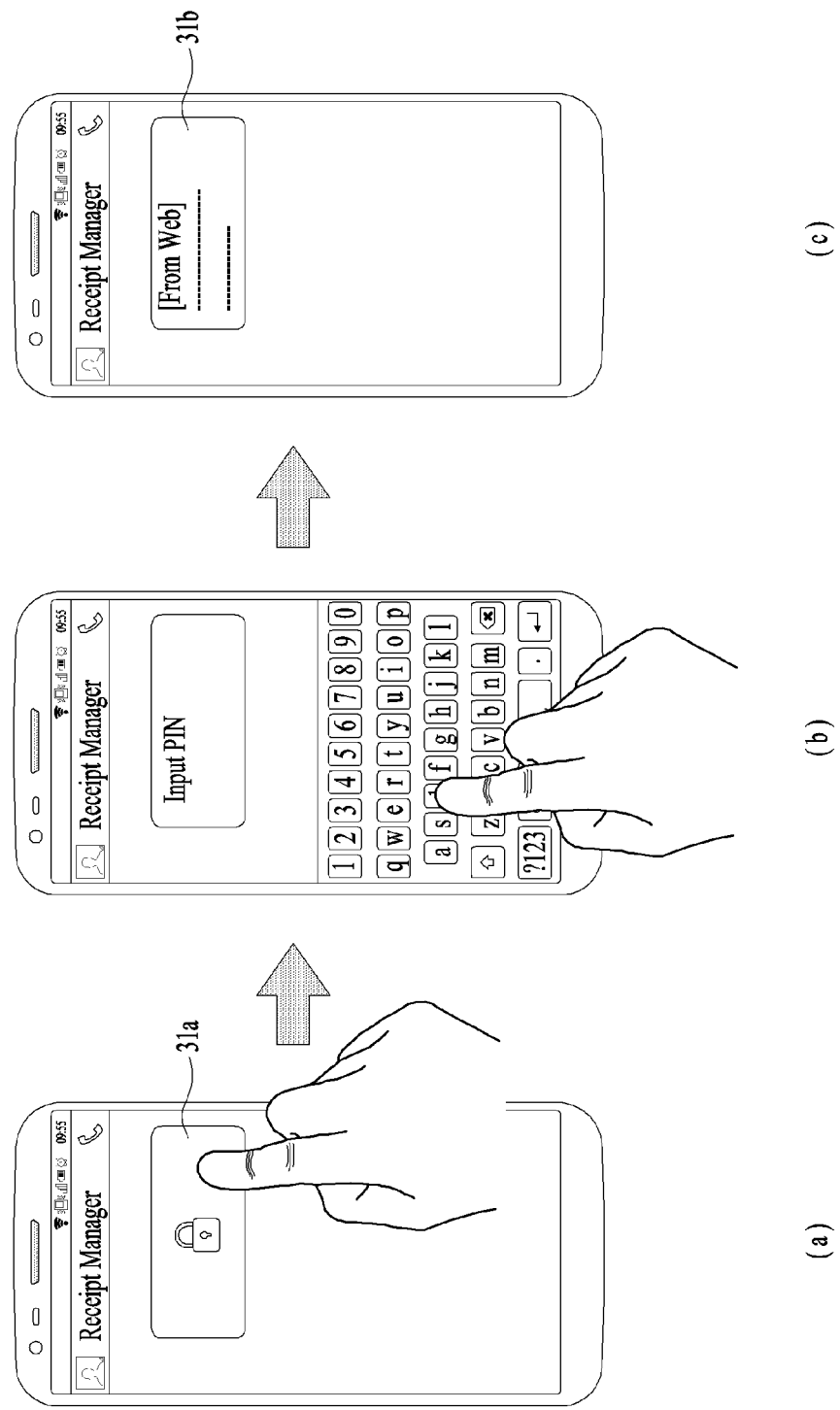
FIG. 13 is a diagram illustrating an encrypted receipt according to one embodiment of the present invention.

FIG. 13 is a diagram illustrating an encrypted receipt according to one embodiment of the present invention. Referring to FIG. 13(*a*), a receipt manager currently displaying receipt data is illustrated. As mentioned in the foregoing description, the display device can switch a payment mode to a second mode from a first mode. In this instance, the second mode may include a separate processing mode. Generally, the second mode may include a mode for performing a receipt non-issuance function. Yet, the second mode may include a function of setting a security on a receipt or a function of saving payment breakdown summary information.

Meanwhile, when a receipt is saved in the second mode, if the display device performs a payment function, the display device can receive receipt data containing a breakdown of payment card uses. When a payment is made in the second mode, the display device can encrypt the received receipt data. In particular, the display device can set a lock attribute on the received receipt data. In this instance, a password for unlock may include the numerals previously set by a user. The receipt manager can display a locked receipt data 31a. For unlock, the locked receipt data 31a can be selected.

Referring to FIG. 13(b), an unlocking process is illustrated. If the locked receipt data 31a is selected, a password input window and a keypad can be displayed. And, the display device can receive an input of a password from a user. Referring to FIG. 13(c), an unlocked receipt data 31b is illustrated. If the input password matches a saved password, the display device can cancel the lock setup. The unlocked receipt data 31b may contain detailed breakdown information on uses of the payment card. In particular, when the lock attribute set receipt data is displayed, if the lock attribute set receipt data is selected and unique information for an unlock is input, the display device can release the lock attribute of the selected receipt data.

According to the embodiment described with reference to FIG. 13, a lock setup of a receipt data is individually released. Yet, since the receipt manager may contain a plurality of receipt data, it may require a method of releasing lock setups of all receipt data.

Figure 14:
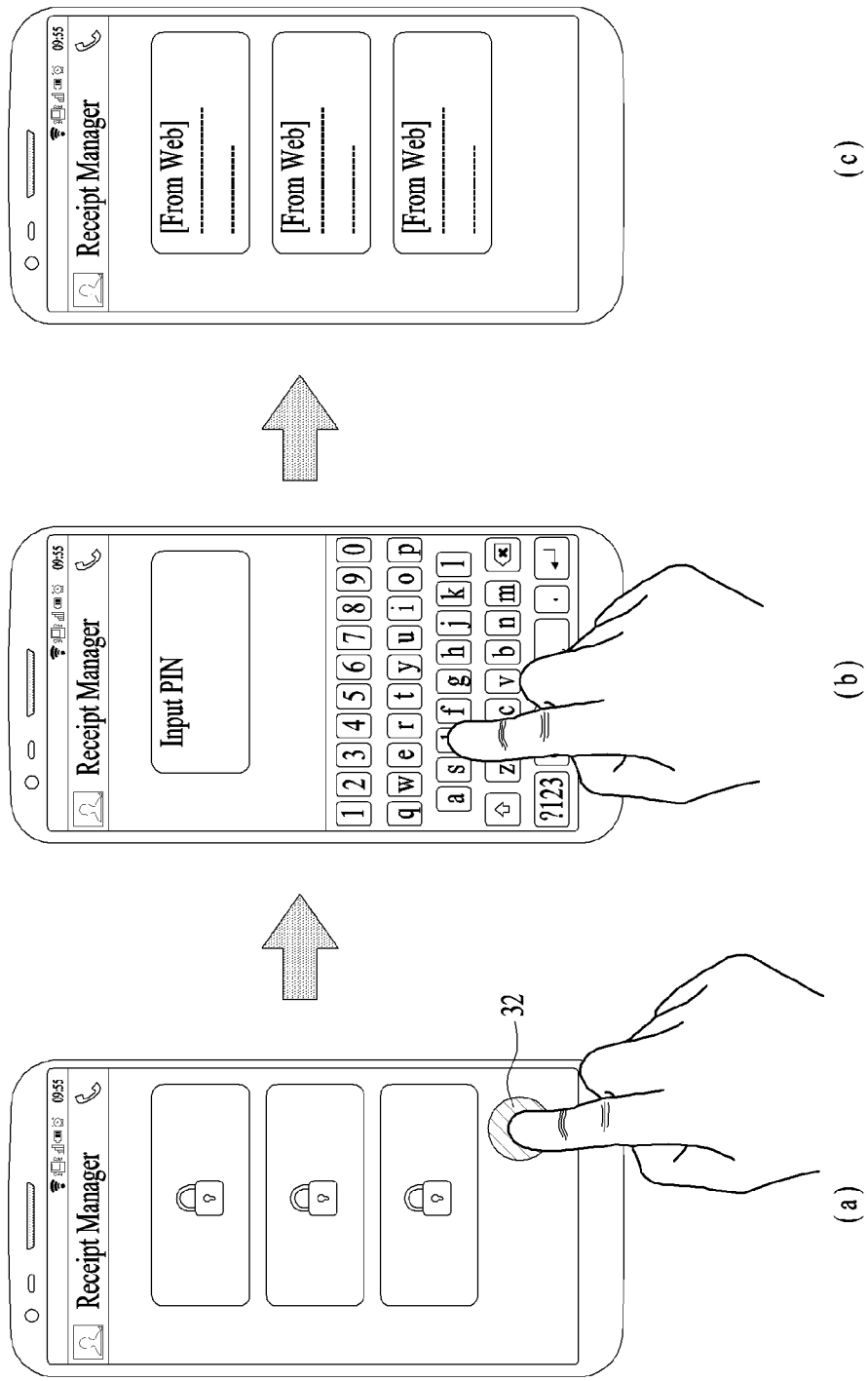
FIG. 14 is a diagram illustrating an encrypted receipt according to another embodiment of the present invention.

FIG. 14 is a diagram illustrating an encrypted receipt according to another embodiment of the present invention. Referring to FIG. 14(a), a receipt manager currently displaying receipt data is illustrated. The receipt manager may contain a plurality of receipt data. And, lock attributes may be set on all the receipt data. If the display device receives an input of a command for selecting a specific receipt data, it can release the lock setup of the selected receipt data only. The display device can receive an input of a touch gesture 32 onto a region on which the receipt data is not displayed. If the locked receipt data is not selected, the display device can unlock all the receipt data.

Referring to FIG. 14(b), an unlocking process is illustrated. The display device can display a password input window and a keypad. And, the display device can receive an input of a password from a user. Referring to FIG. 14(c), an unlocked receipt data is illustrated. If the input password matches a saved password, the display device can cancel the lock setup. The display device can cancel the lock setups of all receipt data. Meanwhile, the display device can cancel the lock setups of all receipt data currently kept in the receipt manager or may cancel the lock setup of a currently displayed receipt data only. For instance, when the receipt manager keeps 10 locked receipt data, if there are 3 displayed receipt data, the display device can cancel the lock setups of the 10 receipt data or may cancel the lock setups of the 3 displayed receipt data only. The display device can tag additional information to receipt data in the second mode. A method of managing receipt data tagged with additional information is described in detail as follows.

Figure 15:
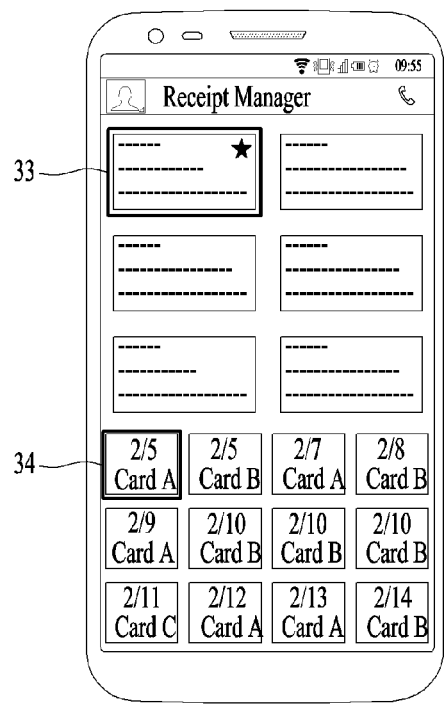
FIG. 15 is a diagram illustrating a process for managing a receipt in second mode according to one embodiment of the present invention.

FIG. 15 is a diagram illustrating a process for managing a receipt in second mode according to one embodiment of the present invention. Referring to FIG. 15, a receipt manager currently displaying a detailed breakdown region and a summarized breakdown region is illustrated. The detailed breakdown region contains receipt data that includes a detailed breakdown of use, while the summarized breakdown region may contain schematic information of receipt data.

The display device can add additional information in the second mode. The additional information may include check information indicating an important receipt. If the check information is selected in the second mode and a payment card is used, the display device can control check information mark to be contained in the use breakdown receipt data. According to one embodiment, the receipt data 33 containing the check information mark may contain a mark of a star shape. Meanwhile, the receipt data can include the receipt data 33 containing the check information mark and a general receipt data in the detailed breakdown region. The receipt data can be displayed in a manner that the receipt data 33 containing the check information mark can be distinguished from the general receipt data.

The summarized breakdown region may contain important receipt summary information corresponding to the receipt data contained in the detailed breakdown region. Hence, the summarized breakdown region can contain important receipt summary information 34 corresponding to the receipt data 33 containing the check information mark. The receipt manager can display the important receipt summary information 34 distinguished from the general summary information in a manner similar to that of the receipt data 33 containing the check information mark. Meanwhile, the receipt manager may manage only the receipt data 33 containing the check information mark among the receipt data containing paid use breakdown information in the second mode.

Figure 16:
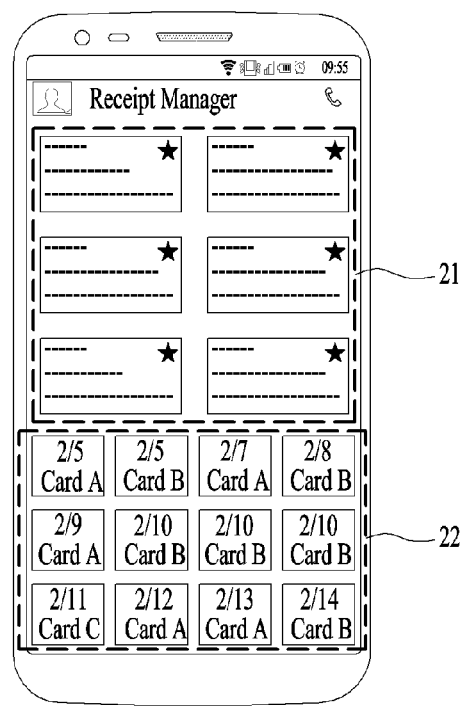
FIG. 16 is a diagram illustrating a process for managing a receipt in second mode according to another embodiment of the present invention.

FIG. 16 is a diagram illustrating a process for managing a receipt in second mode according to another embodiment of the present invention. Referring to FIG. 16, a receipt manager currently displaying a detailed breakdown region 21 and a summarized breakdown region 22 is illustrated. The detailed breakdown region contains receipt data that includes a detailed breakdown of use, while the summarized breakdown region may contain schematic information of receipt data. The detailed breakdown region 21 shown in FIG. 16 can include the receipt data containing the check information only. In particular, if the receipt data failing to contain the check information is received in the second mode, the receipt manager extracts the summary information only but may not manage the receipt data. Hence, the detailed breakdown region 21 of the receipt manager may include the receipt data containing the check information only.

Meanwhile, the summarized breakdown region 22 may contain the summary information of all receipt data. In particular, the summarized breakdown region 22 can include the summary information extracted from the receipt data failing to contain the check information as well as the summary information corresponding to the receipt data containing the check information.

Figure 17:
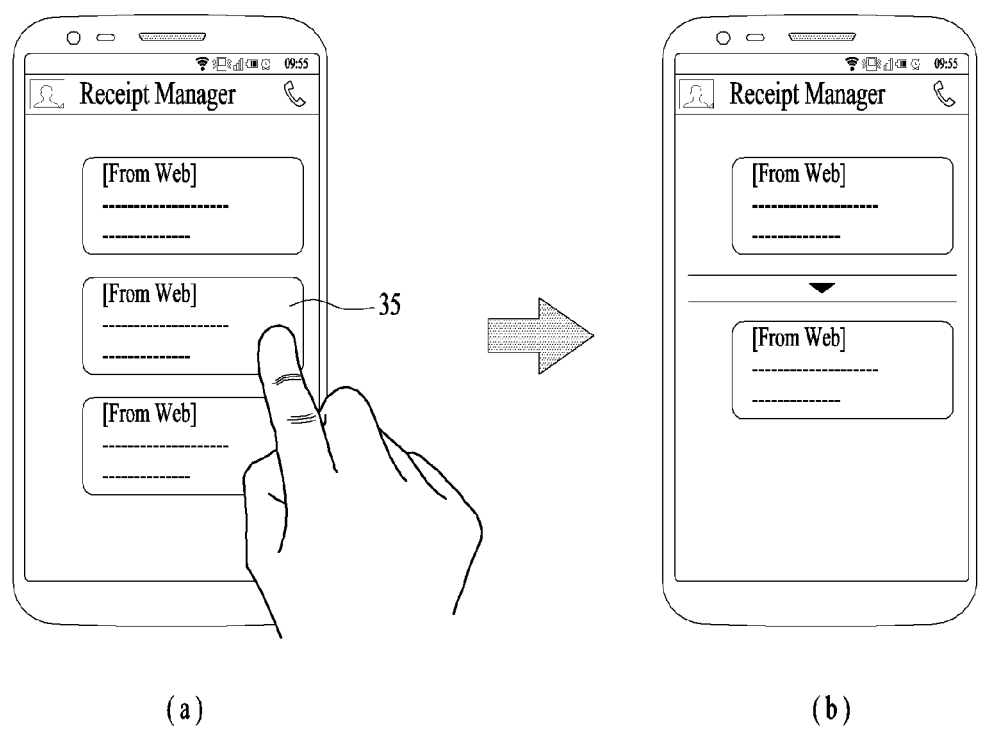
FIG. 17 is a diagram illustrating a process for managing a checked receipt according to one embodiment of the present invention.

FIG. 17 is a diagram illustrating a process for managing a checked receipt according to one embodiment of the present invention Referring to FIG. 17, receipt data containing a use breakdown is illustrated. A receipt manager can display the receipt data containing the use breakdown irrespective of a mode. Yet, only if the lock setup is cancelled in the second mode, the receipt manager can display the receipt data containing the use breakdown. In case of an initial check, the receipt data can be displayed as shown in FIG. 17(a). In order to mean that a user has checked the corresponding receipt data, the user can select a prescribed receipt data 35. After the user has checked the receipt data, the user ends the receipt manager and may be then able to launch the receipt manager again.

Referring to FIG. 17(b), a receipt manager currently displaying a mark to mean a folded state is illustrated. First of all, if a user selects a receipt data 35, the selected receipt data may not be displayed. Yet, a location of the selected receipt data 35 can be marked to mean a folded state. If the user selects the receipt data 35, the receipt manager can immediately hide the selected receipt data 35.

Meanwhile, after a user has checked a receipt data, if the user ends a receipt manager and then launches the receipt manager again, the receipt manager hides all the previously checked receipt data and can then display a mark to mean the folded state. The hidden receipt data can be displayed again.

Figure 18:
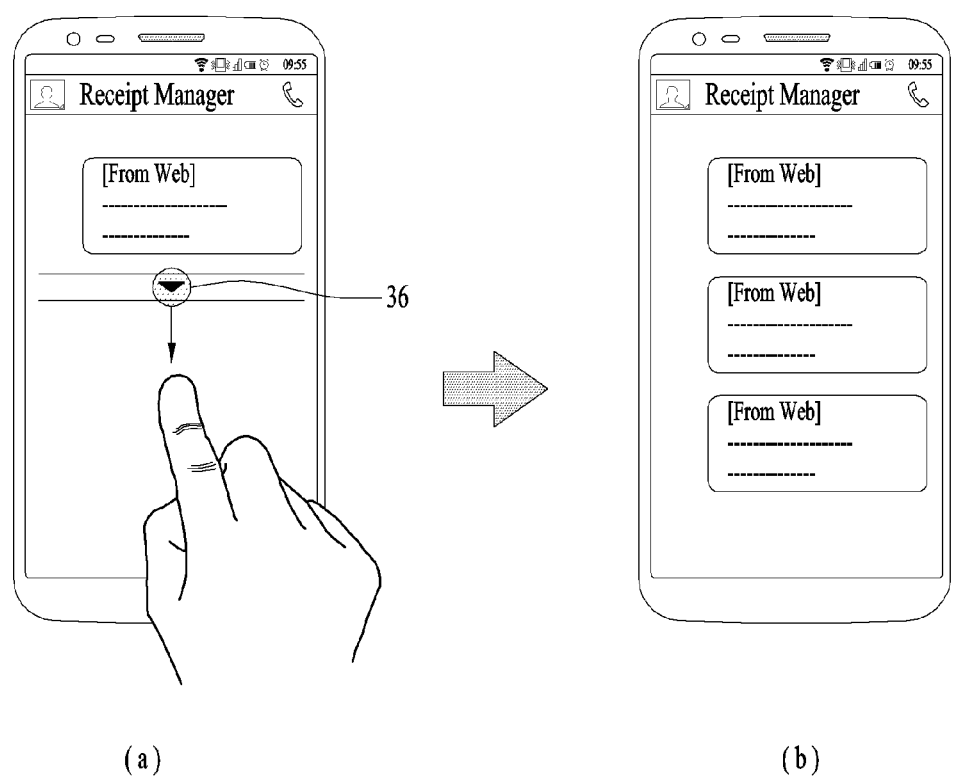
FIG. 18 is a diagram illustrating a process for managing a checked receipt according to another embodiment of the present invention.

FIG. 18 is a diagram illustrating a process for managing a checked receipt according to another embodiment of the present invention. Referring to FIG. 18(a), a receipt manager currently displaying a mark 36 for meaning a folded state is illustrated. The receipt manager can display a receipt data and the mark 36 for meaning the folded state together. The mark 36 for meaning the folded state may include a selected receipt data. The mark 36 for meaning the folded state may mean a checked receipt data. A user selects the mark 36 for meaning the folded state and can then input a sweep gesture.

Referring to FIG. 18(b), unfolded receipt data (or, spread receipt data) are illustrated. In case of receiving an input of a sweep gesture onto the mark 36 for meaning the folded state, the receipt manager can display a receipt data that was not displayed. For instance, if the receipt manager receives selection of two receipt data and displays the mark 36 for meaning the folded state, the receipt manager receives an input of a sweep gesture and can display two receipt data again. Hence, the receipt manager shown in FIG. 18(b) can display 3 receipt data.

When a user uses a payment card, the receipt manager can manage numerous receipt data. The user can efficiently manage the receipts by folding the checked receipt data. Moreover, if necessary, the user can check the folded receipt data by unfolding (or spreading) the folded receipt data.

Figure 19:
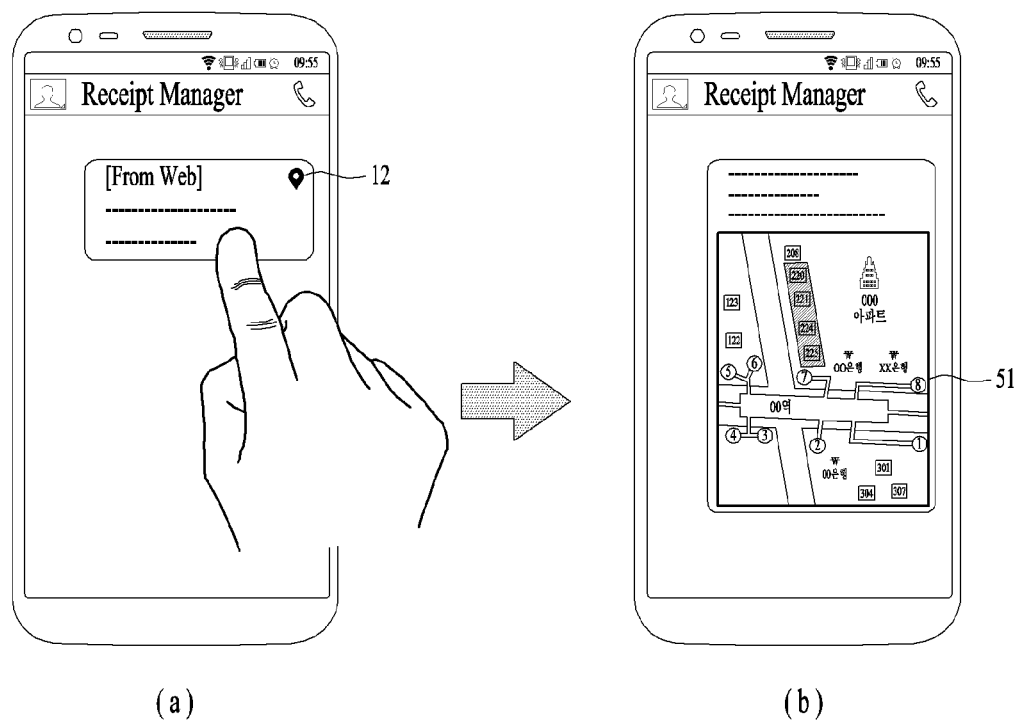
FIG. 19 is a diagram illustrating a receipt tagged with map information according to one embodiment of the present invention.

An embodiment related to additional information tagged to receipt data in second mode is described in detail as follows. FIG. 19 is a diagram illustrating a receipt tagged with map information according to one embodiment of the present invention.

Referring to FIG. 19(a), receipt data containing location information mark 12 is illustrated. A user launches a second mode and can then select location information. If the display device having the location information selected receives a receipt data containing a breakdown of use, the display device can add the location information mark 12. The receipt manager can display the receipt data containing the location information mark 12. The user can select the receipt data containing the location information mark 12. Alternatively, the user can select the location information mark 12.

Referring to FIG. 19(b), the receipt data containing the location information is illustrated. If the receipt data containing the location information mark 12 is selected, the display device can launch a UI for adding location information. For instance, the display device can launch a map application on which a current location is displayed. If a user's selection is input onto the map application, the display device captures displayed map information 15 and can then insert the captured map information in the receipt data containing the location information mark 12.

If the receipt data containing the location information mark 12 is selected, the display device can calculate the current location on the map application using a communication signal or a GPS signal. If the current location is calculated, the display device captures the map information 15 containing the current location and can then insert it in the receipt data containing the location information mark 12.

Figure 20:
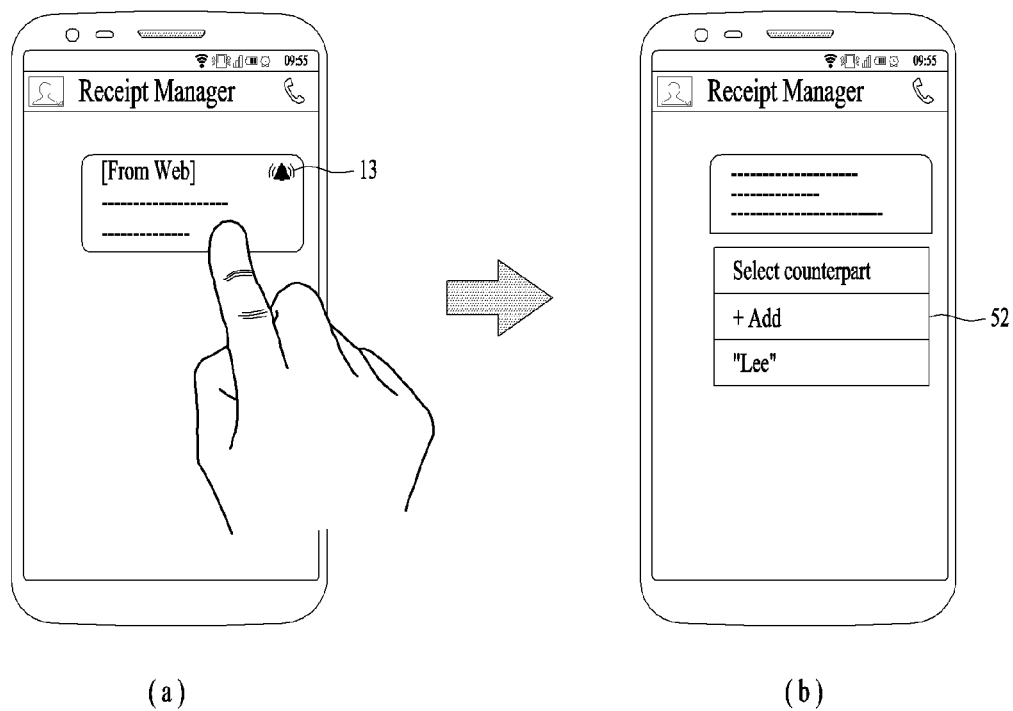
FIG. 20 is a diagram illustrating a receipt tagged with notification information according to one embodiment of the present invention.

FIG. 20 is a diagram illustrating a receipt tagged with notification information according to one embodiment of the present invention. Referring to FIG. 20(a), a receipt data containing notification information mark 13 is illustrated. A user launches a second mode and can then select notification information. If the display device having the notification information selected receives a receipt data containing a breakdown of use, the display device can add the notification information mark 13. The receipt manager can display the receipt data containing the notification information mark 13. The user can select the receipt data containing the notification information mark 13. Alternatively, the user can select the notification information mark 13.

Referring to FIG. 20(b), the receipt data containing the notification information is illustrated. If the receipt data containing the notification information mark 13 is selected, the display device can launch a menu for selecting or adding a counterpart for the notification. If the counterpart adding menu is selected, the display device can display a list of numbers saved in a phonebook. The display device can receive a command for selecting a number from the displayed number list. The display device can select a counterpart of the selected number as a notification counterpart. If a command for a touch to the displayed counterpart is input, the display device can send the receipt data to the number of the displayed counterpart.

Meanwhile, the display device can further add a counterpart for a notification. The display device can display a plurality of counterparts if the counterpart is further added. And, the display device can display a separate send button together. If the displayed send button is selected, the display device can send receipt data to a plurality of the displayed counterparts.

Figure 21:
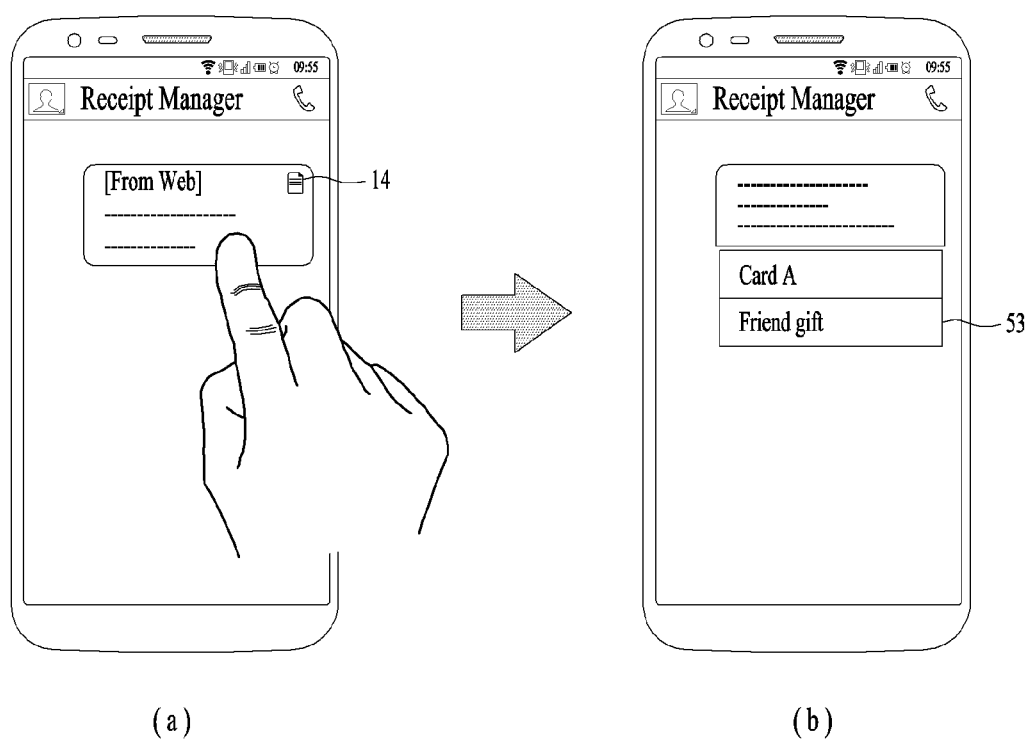
FIG. 21 is a diagram illustrating a receipt tagged with memo information according to one embodiment of the present invention.

FIG. 21 is a diagram illustrating a receipt tagged with memo information according to one embodiment of the present invention. Referring to FIG. 21(a), a receipt data containing memo information mark 14 is illustrated. A user launches a second mode and can then select memo information. If the display device having the memo information selected receives a receipt data containing a breakdown of use, the display device can add the memo information mark 14. The receipt manager can display the receipt data containing the memo information mark 14. The user can select the receipt data containing the memo information mark 14. Alternatively, the user can select the memo information mark 14.

Referring to FIG. 21(b), the receipt data containing the memo information is illustrated. If the receipt data containing the memo information mark 14 is selected, the display device can display a memo region 53. The display device can display a keypad for inputting text together with the memo region 53. The display device can recognize a text input to the memo region 53. After the text has been input, if a save button is selected, the display device can add the memo information to the receipt data. If the memo information added to the receipt data is selected again, the display device can launch an editing mode. In particular, the display device activates the text input memo region 53. The input text can be amended or a text can be added.

Figure 22:
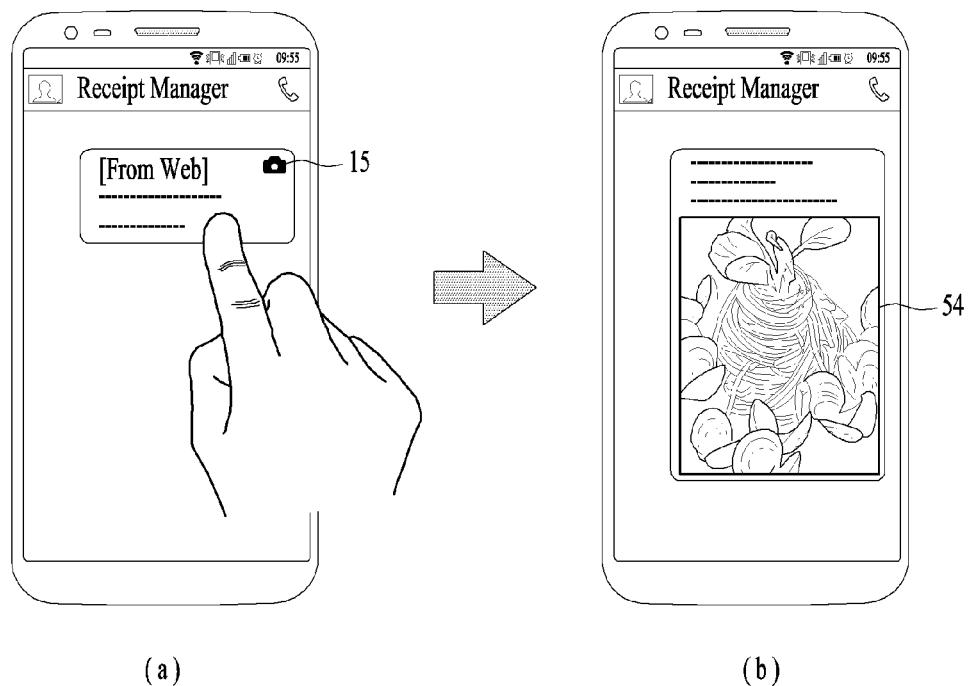
FIG. 22 is a diagram illustrating a receipt tagged with photo information according to one embodiment of the present invention.

FIG. 22 is a diagram illustrating a receipt tagged with photo information according to one embodiment of the present invention. Referring to FIG. 22(a), a receipt data containing photo information mark 15 is illustrated. A user launches a second mode and can then select photo information. If the display device having the photo information selected receives a receipt data containing a breakdown of use, the display device can add the photo information mark 15. The receipt manager can display the receipt data containing the photo information mark 15. The user can select the receipt data containing the photo information mark 15. Alternatively, the user can select the photo information mark 15.

Referring to FIG. 22(b), the receipt data containing the photo information is illustrated. If the receipt data containing the photo information mark 15 is selected, the display device can activate a camera. The display device can control a shot image 54 to be contained in the receipt data. A user may reselect the receipt data containing the photo information mark 15. The display device re-activates the camera and can then control a new shot image 54 to be contained in the receipt data.

Meanwhile, the display device receives receipt data in first mode, second mode and third mode and can save the received receipt data. The display device can save the received receipt data not in a general folder but in a separate receipt folder. And, the display device can manage the receipt folder per mode individually. Moreover, the display device can set up a lock function on the receipt folder having the received receipt data saved therein.

According to the embodiments described with reference to FIGS. 19 to 22, single additional information is contained in a receipt data. Yet, a plurality of additional information may be selected. When a plurality of additional information are selected, the display device can control a mark, which is related to the selected additional information, to be contained in the receipt data. If additional information mark is selected, the display device can enable a function related to the selected additional information. Meanwhile, the payment mode of the display device can include a third mode as well as the second mode.

Figure 23:
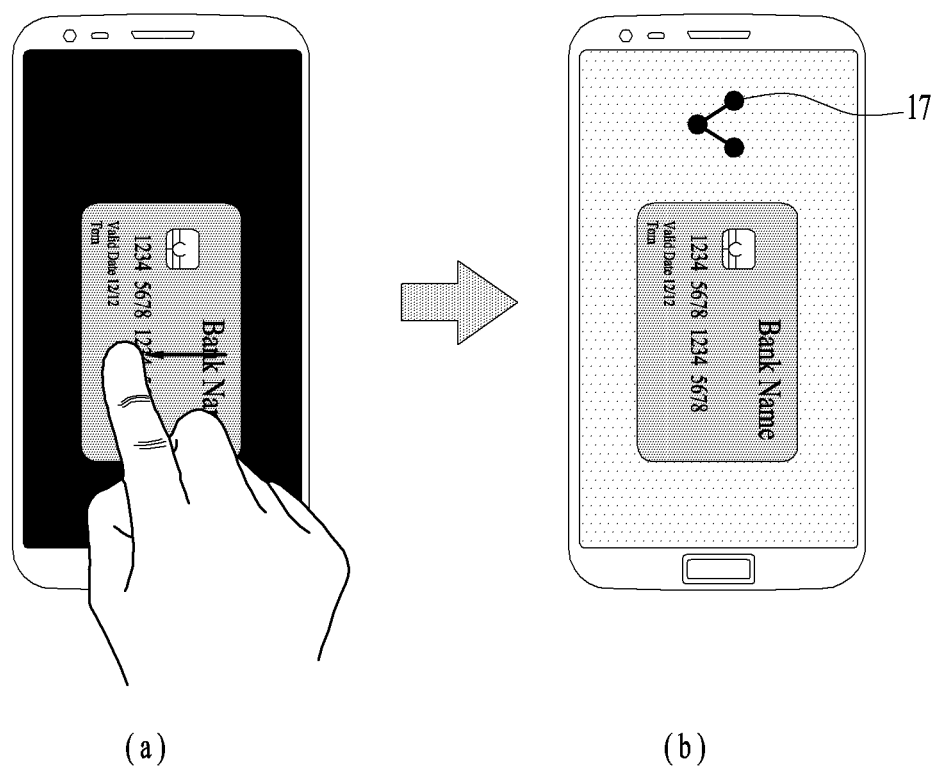
FIG. 23 is a diagram illustrating a process for switching to a third mode from a second mode according to one embodiment of the present invention.

FIG. 23 is a diagram illustrating a process for switching to a third mode from a second mode according to one embodiment of the present invention. Referring to FIG. 23(a), a display device having launched a second mode in the payment mode is illustrated. The display device displays a payment card and can output a screen in a background color that means the second mode. A user can input a sweep touch gesture of applying a touch to one point on a display unit and then moving to another point by holding the touch.

Referring to FIG. 23(b), the display device having launched the third mode is illustrated. The display device can recognize the sweep touch gesture input in the second mode as a third mode switching command. Hence, if the display device receives an input of the sweep touch gesture in the second mode, the display device can switch to the third mode. In this instance, the third mode may mean a share mode for sharing a use breakdown. According to notification information in the second mode, additional information should be selected before making a payment and a counterpart should be selected individually. Yet, in the third mode, a counterpart to share receipt data with can be set in advance.

If the display device switches to the third mode, the display device can change a color of a background screen to a color indicating the third mode. When the display device switches to the third mode, the display device can output a notification sound or vibration. If the display device switches to the third mode, the display device can display a mark 17 indicating the share mode. When the display device switches to the third mode, the display device can display a contact of a recipient preset to share or an indicator indicating the recipient.

Figure 24:
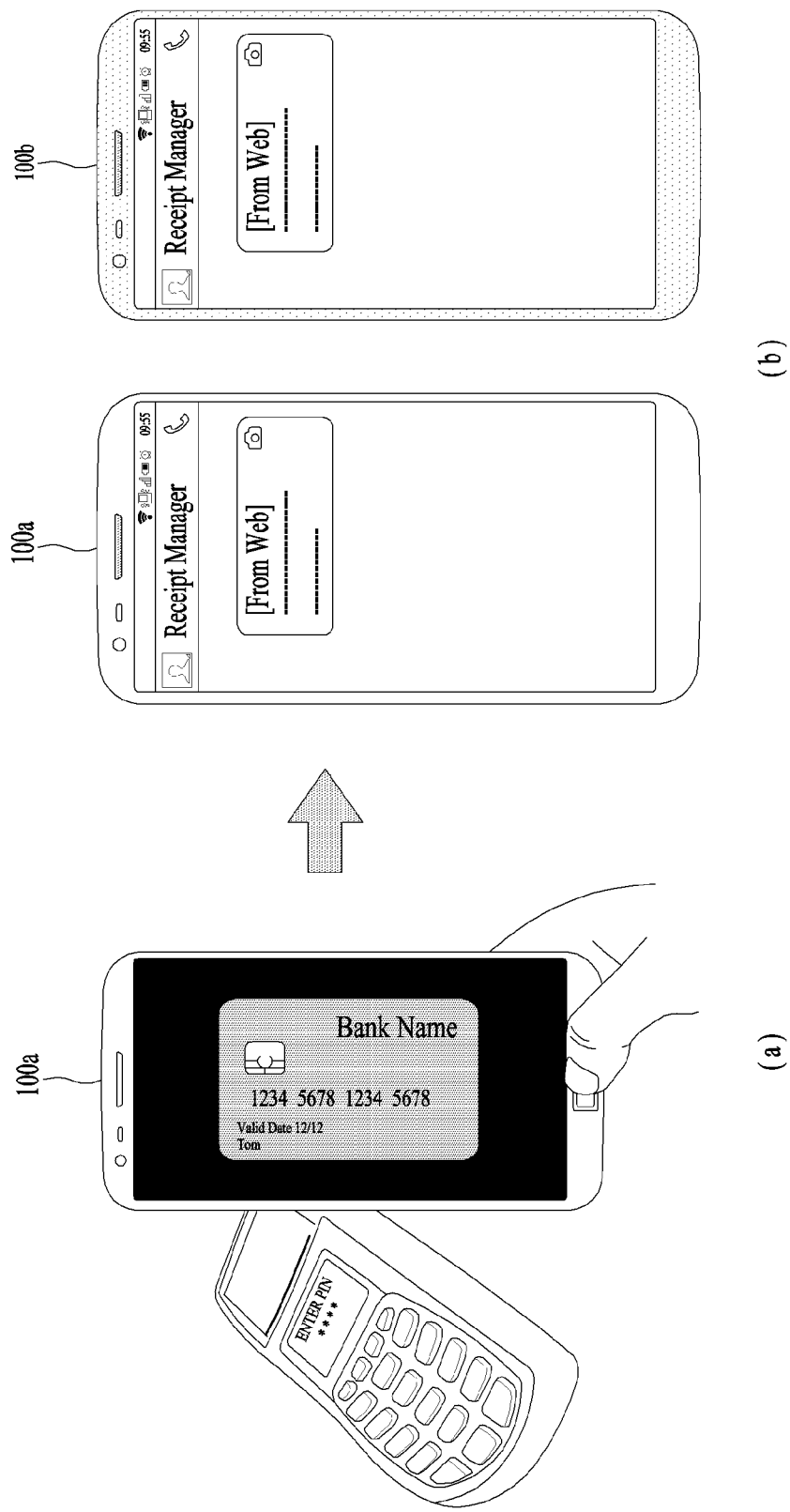
FIG. 24 is a diagram illustrating a process for managing a receipt in third mode according to one embodiment of the present invention.

FIG. 24 is a diagram illustrating a process for managing a receipt in third mode according to one embodiment of the present invention. Referring to FIG. 24(a), a display device 100a performing a payment function in third mode is illustrated. The display device 100a can switch to a first mode corresponding to a general payment mode. The display device 100a can switch to a second mode corresponding to a separate processing mode from the first mode. And, the display device 100a can switch to a third mode corresponding to a share mode from the second mode. If the display device 100a performs a payment function, the display device 100a can receive a receipt data containing a use breakdown. In the third mode, a recipient manager can manage the receipt data in the same manner of the first mode.

Referring to FIG. 24(b), the display device 100a having performed the share function is illustrated. If the display device 100a of a user makes a payment in the third mode, the share function can be performed. The display device 100a of the user can send receipt data containing a use breakdown to a display device 100b of a counterpart. In this instance, a counterpart to which the receipt data will be sent can be set in advance.

For instance, the counterpart to which the receipt data will be sent can be set based on at least one of a card type, a use time, a use area and a card use breakdown. For instance, when a user uses a company card, receipt data can be set to be sent to an employee of a management department of a company. When a user makes a payment with a card of his own, the user can make the payment by setting the first or second mode. Yet, when the user makes a payment with a company card, the user can make the payment by setting the third mode. Once a mode of the display device is set to the third mode, receipt data based on the card payment can be sent to a terminal device of a preset employee of the management department of the company.

When a user uses a card for a life expense item, receipt data can be set to be sent to a wife of the user. When a user uses a card for a personal expense item, the user can make a payment by setting the first or second mode. When a user makes a payment for a life expense item, the user can make a payment by setting the third mode. If the display device is set to the third mode, the display device can send receipt data, which is based on the card payment, to a preset terminal device of a user's wife.

Meanwhile, the first mode can launch a general payment function, the second mode can launch a separate processing mode, and the third mode can launch a use breakdown sharing function. The display device can switch to the second mode from the first mode. The display device can switch to the third mode from the second mode. Yet, the first to third modes can be used interchangeably. For instance, the display device cans witch to the use breakdown sharing function in the course of launching the generally payment function. In another instance, the display device can switch to the separate processing mode in the course of launching the use breakdown sharing function. For further instance, the display device can switch to the general payment function in the course of launching the separate processing mode, and vice versa.

So far, various embodiments related to the payment mode are described. A method of controlling a display device is described in the following. FIG. 25 is a flowchart for a method of controlling a display device according to one embodiment of the present invention.

Referring to FIG. 25, a display device can display a payment card (S2510). The display device can receive an input of identification information for user authentication (S2520). If the display device launches a card payment function, the display device can display a card to make a payment. Subsequently, the display device can perform a user authentication process. On the contrary, if the display device launches the card payment function, the display device displays a figure image. If the user authentication process is completed, the display device can display a payment card. As mentioned in the foregoing description, the order in performing a payment card displaying process and a user authentication process can be set freely.

If saved identification information and the input identification match each other, the display device can launch a first mode for performing a general payment function (S2530). According to one embodiment, the identification information may include fingerprint information.

When receiving an input of a first touch gesture, the display device can switch from the first mode to a second mode for performing a separate processing mode (S2540). According to one embodiment, the first touch gesture may include a long touch gesture.

Hence, when the identification information for the user authentication is input, the display device can receive an input of the long touch gesture containing the fingerprint information. If the input fingerprint information matches the saved fingerprint information, the display device can launch the first mode. After the first mode has been launched, if the input of the long touch gesture is held over a preset time, the display device can switch to the second mode. The display device can add additional information to the receipt data in the second mode.

The additional information may include at least one of check information indicating an important receipt, location information indicating a location of a corresponding use, memo information, notification information for sharing a use breakdown with a counterpart, image information indicating a shot image and the like. When receiving an input of a second touch gesture, the display device can switch to a third mode for performing a use breakdown sharing function from the second mode.

The above-described present invention can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
  a wireless communication unit configured to provide wireless communication;
  a touch screen;
  a user input unit configured to receive an input of identification information for a user authentication; and
  a controller configured to:
  launch a payment mode including a first mode and a second mode, wherein the second mode performs at least one of a receipt not-issuance function, a secret payment function and a payment summary storing function,
  display a guide of a fingerprint recognition region on a predetermined region on the touch screen,
  receive a first touch gesture containing a fingerprint information on the predetermined region on the touch screen,
  launch the first mode for performing a general payment function in response to the fingerprint information matching stored fingerprint information,
  display on the touch screen a display object containing payment card information in the first mode,
  launch the second mode for performing a separate processing mode if the first touch gesture on the touch screen is maintained over a predetermined time after the first mode is launched,
  detect a direction of a long axis of the display device,
  switch from the first mode to the second mode in response to detecting a 90 degrees rotation while the display device is launching the payment mode as the first mode, and
  switch from the second mode to the first mode in response to detecting a 90 degrees rotation while the display device is launching the payment mode as the second mode.

2. The display device of claim 1, wherein the controller is further configured to output a notification indicating the first mode is switching to or has switched to the second mode.

3. The display device of claim 2, wherein the notification includes at least one of changing a color of a background screen, outputting a preset sound, and outputting a preset vibration.

4. The display device of claim 1, wherein the controller is further configured to display a menu on the touch screen for tagging additional information to receipt data.

5. The display device of claim 4, wherein the additional information comprises at least one of check information indicating an important receipt, location information indicating a location of a corresponding payment, memo information, notification information for sharing a payment breakdown with a counterpart and image information indicating a captured image.

6. The display device of claim 1, wherein the wireless communication unit is further configured to receive receipt data containing a payment breakdown using the display object containing the payment card information, and
  wherein the controller is further configured to set a lock attribute on the received receipt data in response to a payment being made in the second mode.

7. The display device of claim 6, wherein the controller is further configured to:
  release the lock attribute of the receipt data in response to an unlock command being successfully input.

8. The display device of claim 6, wherein the set lock attribute includes a plurality of lock attributes set for a plurality of receipt data, and
wherein the controller is further configured to release the lock attributes for all the receipt data in response to a touch selection of a predetermined region on the touch screen and an unlock command being successfully input.

9. The display device of claim 1, wherein the controller is further configured to switch from the second mode to a third mode for performing a payment use breakdown sharing function in response to a preset second touch gesture.

10. The display device of claim 9, wherein controller is further configured to control the wireless communication unit to transmit payment use data to a preset user in response to a payment being made in the third mode.

11. The display device of claim 10, wherein the controller is further configured to set the preset user based on at least one of a card type, a payment use time, a payment use area and a card use breakdown.

12. A method of controlling a display device, the method comprising:
receiving, via a user input unit, an input of identification information for a user authentication;
displaying, via a touch screen, a guide of a fingerprint recognition region on a predetermined region on the touch screen;
receiving, via the user input unit, a first touch gesture containing a fingerprint information on the predetermined region on the touch screen;
launching, via a controller, a payment mode including a first mode and a second mode, wherein the second mode performs at least one of a receipt not-issuance function, a secret payment function and a payment summary storing function;
launching, via the controller, the first mode for performing a general payment function in response to the fingerprint information matching stored fingerprint information;
displaying, via the touch screen, a display object containing payment card information in the first mode;
launching, via the controller, the second mode for performing a separate processing mode if the first touch gesture on the touch screen is maintained over a predetermined time after the first mode is launched;
detecting, a direction of a long axis of the display device;
switching, via the controller, from the first mode to the second mode in response to detecting a 90 degrees rotation while the display device is launching the payment mode as the first mode; and
switching, via the controller, from the second mode to the first mode in response to detecting a 90 degrees rotation while the display device is launching the payment mode as the second mode.

13. The method of claim 12, further comprising:
outputting a notification indicating the first mode is switching to or has switched to the second mode.

14. The method of claim 13, wherein the notification includes at least one of changing a color of a background screen, outputting a preset sound, and outputting a preset vibration.

15. The method of claim 12, further comprising:
displaying a menu on the touch screen for tagging additional information to receipt data.

16. The method of claim 15, wherein the additional information comprises at least one of check information indicating an important receipt, location information indicating a location of a corresponding payment, memo information, notification information for sharing a payment breakdown with a counterpart and image information indicating a captured image.

17. The method of claim 12, further comprising:
receiving, via a wireless communication unit, receipt data containing a breakdown of using the display object containing the payment card information; and
setting, via the controller, a lock attribute on the received receipt data in response to a payment being made in the second mode.

18. The method of claim 17, further comprising:
releasing, via the controller, the lock attribute of the receipt data in response to an unlock command being successfully input.

* * * * *